US012000382B2

(12) United States Patent
Kristoffersen

(10) Patent No.: US 12,000,382 B2
(45) Date of Patent: Jun. 4, 2024

(54) PLATFORM FOR A HUB OF A WIND TURBINE

(71) Applicant: Siemens Gamesa Renewable Energy A/S, Brande (DK)

(72) Inventor: Nicolai Kristoffersen, Vejle (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 0 days.

(21) Appl. No.: 17/706,703

(22) Filed: Mar. 29, 2022

(65) Prior Publication Data

US 2022/0325700 A1 Oct. 13, 2022

(30) Foreign Application Priority Data

Apr. 9, 2021 (EP) .................................. 21167602

(51) Int. Cl.
*F03D 80/50* (2016.01)
*E04G 3/24* (2006.01)
*F03D 1/06* (2006.01)

(52) U.S. Cl.
CPC .............. *F03D 80/50* (2016.05); *E04G 3/24* (2013.01); *F03D 1/0691* (2013.01)

(58) Field of Classification Search
CPC .......... F03D 80/50; F03D 80/55; F03D 80/88; F03D 80/00; F03D 3/06; F03D 3/061; F01D 1/0691; F05B 2240/14
See application file for complete search history.

(56) References Cited

U.S. PATENT DOCUMENTS

| 9,909,449 B2 * | 3/2018 | Valero Lafuente ..... F03D 80/00 |
| 2004/0232704 A1 | 11/2004 | Casazza et al. |
| 2010/0247311 A1 | 9/2010 | Schlangen et al. |
| 2011/0097202 A1 | 4/2011 | de Buhr et al. |
| 2013/0283550 A1 * | 10/2013 | Clarke .................... E01D 15/08 14/69.5 |
| 2013/0302175 A1 | 11/2013 | Munk-Hansen |
| 2014/0010665 A1 | 1/2014 | Valero Lafuente et al. |
| 2014/0050591 A1 * | 2/2014 | Munk-Hansen ........ F03D 80/80 416/244 R |
| 2015/0069759 A1 * | 3/2015 | Aranovich .............. F03D 3/005 415/60 |
| 2018/0313335 A1 * | 11/2018 | Vanderwalker ......... F03D 80/50 |
| 2020/0166020 A1 * | 5/2020 | Bienes Archel ...... F03D 1/0691 |

FOREIGN PATENT DOCUMENTS

| CN | 102812236 A | 12/2012 |
| CN | 103459839 A | 12/2013 |
| CN | 103590984 A | 2/2014 |
| CN | 107131097 A | 9/2017 |
| CN | 209179952 U | 7/2019 |
| DE | 102008034747 B3 | 9/2009 |

(Continued)

*Primary Examiner* — Brian P Wolcott
*Assistant Examiner* — Maxime M Adjagbe
(74) *Attorney, Agent, or Firm* — Schmeiser, Olsen & Watts, LLP

(57) ABSTRACT

A platform assembly for a hub of a wind turbine is configured to provide a working surface inside the hub. The platform assembly includes a first platform coupled to a hub access structure, wherein the hub access structure extends in an axial direction between a nacelle of the wind turbine and the hub and provides access from the nacelle to the hub.

17 Claims, 19 Drawing Sheets

(56) References Cited

FOREIGN PATENT DOCUMENTS

| | | |
|---|---|---|
| DE | 202012006595 U1 | 8/2012 |
| EP | 2484893 A2 | 8/2012 |
| EP | 2484894 A2 | 8/2012 |
| EP | 2505822 A1 | 10/2012 |
| EP | 2698529 | 2/2014 |
| EP | 2724020 A1 | 4/2014 |

* cited by examiner

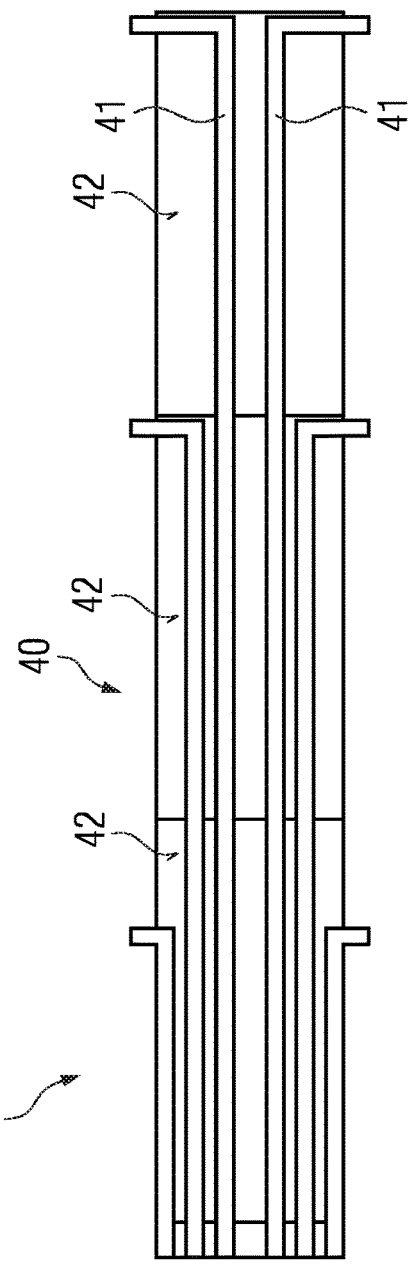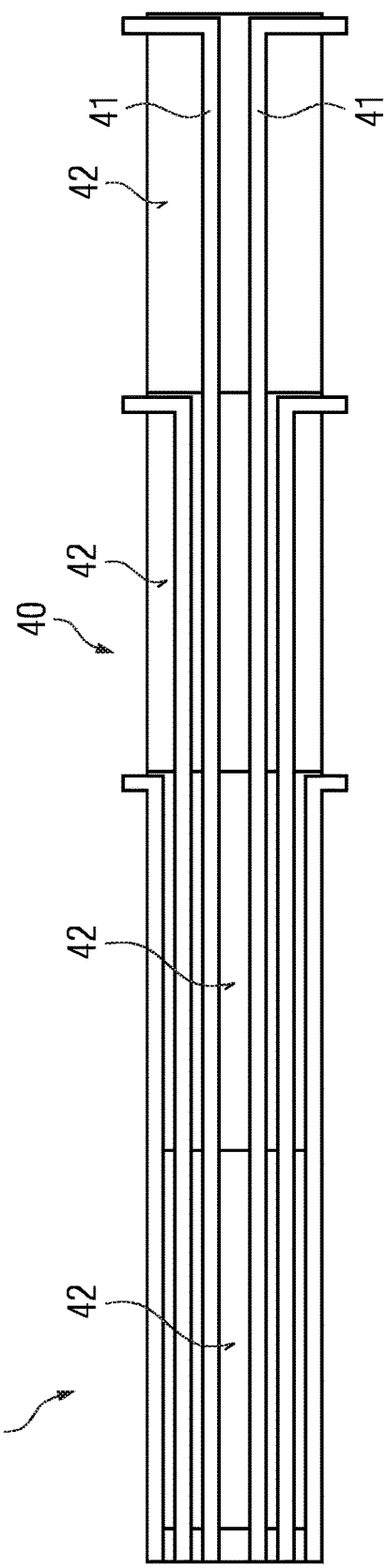

PLATFORM FOR A HUB OF A WIND TURBINE

CROSS-REFERENCE TO RELATED APPLICATIONS

This application claims priority to EP Application No. 21167602.8, having a filing date of Apr. 9, 2021, the entire contents of which are hereby incorporated by reference.

FIELD OF TECHNOLOGY

The following relates to a platform assembly for a hub of a wind turbine configured to provide a working surface inside the hub.

BACKGROUND

Wind turbines are increasingly used for the generation of electrical energy. A wind turbine typically comprises a tower and a nacelle mounted on the tower, to which a hub is attached. A rotor is mounted at the hub and coupled to a generator. A plurality of blades extends from the rotor. The blades are oriented in such a way that wind passing over the blades turns the rotor, thereby driving the generator to generate electricity. Hence, the rotational energy of the blades is transferred to the generator, which then converts the mechanical energy into electricity and transfers the electricity to the electrical grid.

The assembly of the wind turbine components is a difficult task due to the limited access to the components from inside the wind turbine. Particularly, the mounting of the blades on the hub during the installation of the wind turbine is difficult due to this limited accessibility. However, this limited accessibility also hinders maintenance tasks inside the hub throughout the lifetime of the wind turbine.

Hence, for installation and maintenance purposes, a platform inside the hub is needed which extends over the axial length of the hub to provide access to the hub components for workers. The platform should not collide with any rotating parts during the operation of the wind turbine. This platform provides a working surface for workers and technicians inside the hub to allow installation and maintenance tasks, such as the installation of the blades during the assembly of the wind turbine, or the maintenance of the blade bearings or of the main bearing, such as the replacement or the tightening of the bolts of the bearings, lubricating and replacing lubricant of the bearings or other routine tasks done during the maintenance of the hub and the components attached to the hub.

Platforms at the hub for installation or maintenance purposes are known from the conventional art. In EP 2 484 893 A2, a service platform mounted on the rotor and comprising a working surface for workers to step on for providing access to the blade root portion of the blade for maintenance purposes is known. This platform is arranged at the outer part of the hub and through an access hatch, the workers can access the interior of the hub. However, this platform does not offer a working surface inside the hub, making the maintenance and tightening of bolts from within the hub difficult.

A possibility which enables access through a working surface within the hub is the use of a removable platform. This removable platform has to be removed when the hub rotates in order not to collide with components installed in the hub during the rotation of the hub. This greatly complicates the installation of the blades, as usually the blades are installed successively by rotating the hub about 120° to install the next blade. This process of blade installation together with the use of a removable platform has the disadvantage that the removable platform has to be detached each time the hub rotates to avoid collisions of the platform with components of the hub. In this case, the removable platform is installed and detached three times for the three times the hub rotates to install the three blades. Hence, the platform is assembled inside the hub for the first blade. Once the blade is installed, the platform is disassembled so that the hub can rotate about 120° without colliding with the platform. Then the platform is assembled again, and the second blade is installed. After this, the platform is disassembled, and the hub is again rotated about 120°. This step is repeated for the third blade. When the installation is finished, the platform is disassembled and hoisted to the ground. Similarly, during maintenance works, the platform has to be hoisted from the ground and coupled and decoupled for each blade.

The use of removable platforms additionally increases the installation costs, as these platforms, which usually consist of a plurality of parts, have to be assembled and disassembled several times during the blade installation. Additionally, the components of the removable platforms have to be hoisted, so for maintenance works a crane might be needed only for hoisting the removable platform components from the ground to the hub of the wind turbine.

An alternative which avoids the use of removable platforms is disclosed in document US 2013/302175 A1. In this document, three circumferentially distributed support platforms are arranged between the spinner cover, which is the cover covering the hub, and the hub to provide access to the interior of the hub for maintenance. This arrangement of three platforms for the three blades of the wind turbine enhances the accessibility to the blades from the interior of the hub, simplifying the maintenance works on the blades from within the hub. This solution is however not ideal, as the platforms will be rotating during the operation of the wind turbine, as they are coupled to the rotor, resulting in more mass to be moved by the rotor, thereby decreasing the efficiency of the turbine. Additionally, due to the plurality of platforms installed in the hub, for wind turbines with a limited spacing inside the hub it will not be possible to install so many platforms. At last, the installation costs increase, as each platform has to be coupled to the hub, increasing the material costs and the assembly costs. Care has to be taken in order that the plurality of platforms do not collide with other components of the hub during the rotation of the hub at normal wind turbine operation.

SUMMARY

An aspect relates to provide a platform assembly for a hub of a wind turbine configured to provide a working surface inside the hub which overcomes the problems known form the conventional art.

According to the invention, the platform assembly for a hub of a wind turbine configured to provide a working surface inside the hub comprises a first platform coupled to a hub access structure.

The hub access structure is a structure such as a platform extending in an axial direction between a nacelle of the wind turbine and the hub. The axial direction is the direction along the axis of rotation of the wind turbine, i.e. along the axis of rotation of the rotor, of the main shaft, etc. The hub access structure provides access for workers to move from the nacelle to the hub.

The first platform increases the working surface around the hub access structure inside the hub. This allows for maintenance and installation works at the hubs inner part in the surroundings of the hub access structure, such as at the main bearing reinforcement plate or at the main bearing.

The advantage of having a platform assembly mounted directly inside the hub at the hub access structure is that the platform assembly can be installed at the hub during the assembly of the wind turbine and does not have to be removed during the operation of the wind turbine. This saves installation time compared to removable platforms, which have to be removed when the wind turbine rotates.

The platform assembly can be used for installation and for service or maintenance of the wind turbine.

A ladder or stairs can be arranged between the hub access structure and the platform assembly so that workers can easily climb from the hub access structure to the platform assembly.

According to an embodiment of the invention, the platform assembly is stationary. By stationary it is meant that the platform assembly does not rotate about the axis of rotation of the wind turbine during the operation of the wind turbine. Hence, for this to be accomplished, the platform assembly and/or the hub access structure are not coupled to a rotating component of the drivetrain of the wind turbine rotating about the axis of rotation of the wind turbine.

For example, the hub access structure can be coupled to the housing of the nacelle, which is a stationary component as well. Even if the nacelle is turned by the yaw system, the nacelle housing does not turn about the axis of rotation of the wind turbine during the operation of the wind turbine.

The hub access structure can extend in the axial direction between the nacelle of the wind turbine and the hub through an opening between the main bearing and the hub. This opening can be an opening at the main bearing or at the main bearing reinforcement plate to avoid contact between the rotating parts of the main bearing and the hub access structure. Hence, neither the hub access structure nor the platform assembly rotate with the main bearing.

An advantage of having a stationary hub access structure and a stationary platform assembly is that the efficiency of the wind turbine increases compared to platform assemblies coupled to the rotor of the wind turbine. This is due to the fact that the rotor does not need to rotate these additional components which do not contribute to the conversion of the rotational energy of the hub to electrical energy by the generator.

Additionally, the platform assembly is designed in such a way that the rotating parts of the hub and of the main bearing do not collide with the stationary hub access structure and the stationary platform assembly during the operation of the wind turbine.

According to another embodiment of the invention, the first platform extends in a direction substantially perpendicular to the axial direction. This means that the length of the first platform elongating in a direction substantially perpendicular to the axial direction is larger than the length of the first platform elongating in a direction substantially parallel to the axial direction.

This is particularly advantageous to avoid collisions between the platform assembly and rotating components of the hub. Hence, the first platform elongates in front of the main bearing reinforcement plate along the side of the plate. As the surface of the reinforcement plate is flat, the rotation of the reinforcement plate does not result in collisions between the reinforcement plate and the first platform when the platform extends in a direction along the radial length of the reinforcement plate. In comparison, a platform being elongated along the axial direction of the hub during operation of the wind turbine might collide with components attached to the hub, such as the pitch lock or other hydraulic actuators installed inside the hub.

The extension of the first platform in the direction substantially perpendicular to the axial direction provides a working surface close to the main bearing. This allows for example to conduct maintenance works on the main bearing, such as the tightening of bolts or the replacement of the lubricant.

According to another embodiment of the invention, the first platform has a position in which the working surface of the first platform extends parallelly to the ground. Hence, workers can walk on the first platform to do maintenance or installation works.

The first platform has a position in which the working surface of the first platform extends both parallelly to the ground and in a direction substantially perpendicular to the axial direction. This allows to do maintenance or installation works on the main bearing by walking on the walking surface of the first platform.

According to another embodiment of the invention, the first platform has a position in which the working surface of the first platform extends substantially perpendicularly to the ground. This position is the parked position of the first platform, where the platform assembly is positioned during the operation of the wind turbine and has the advantage that collisions between the first platform and the hub are avoided during the hub rotation.

According to another embodiment of the invention, the platform assembly comprises a second platform configured to be coupled to the first platform. The second platform is configured to be positioned in such a way that the surface of the second platform extends substantially in the axial direction. This means that the length of the second platform elongating in a direction substantially parallel to the axial direction is larger than the length of the second platform elongating in a direction substantially perpendicular to the axial direction.

The second platform is dimensioned in such a way that the working surface of the platform assembly is configured to extend from the hub access structure to the location of the blade bearings. Hence, the workers can reach the blade bearings from the platform assembly. This allows for example to conduct maintenance works on the blade bearings, such as the tightening of bolts or the replacement of the lubricant.

According to another embodiment of the invention, the second platform has a position in which the working surface of the second platform extends parallelly to the ground. Hence, workers can walk on the first platform to do maintenance or installation works.

The second platform has a position in which the working surface of the second platform extends both parallelly to the ground and in a direction substantially parallel to the axial direction. This allows to do maintenance or installation works on the blade bearings by walking on the walking surface of the second platform.

According to another embodiment of the invention, the second platform is a removable platform. Hence, the second platform is releasably coupled to the first platform.

Under releasable coupling is to be understood a connection between components which can be released without damage of the single components. This connection can be achieved by a semi-permanent joining method. For example, a bolt, screw, pin, rivet, thread, stud or other longitudinal piece can be used as the fastener of the components.

Hence, the second platform can be mounted on the first platform when it is needed and then detached from the first platform during operation of the wind turbine. The second platform can then be stored in the nacelle or hoisted to the ground during operation of the wind turbine.

According to another embodiment of the invention, the second platform is moveable or slidable between a first position below or on top or in front of the first platform and a second position, in which the second platform extends substantially in the axial direction.

Hence, the second platform is stackable in the first position. This has the advantage that the working surface extending in the axial direction is reduced when the second platform is stowed or stacked over, under or in front of the first platform, greatly reducing the working surface of the platform assembly when the platform assembly is not needed. This can be the case during the operation of the wind turbine. By reducing the size of the working platform, collisions between the platform assembly and the rotating parts of the hub can be avoided.

Additionally, a slidable or movable system allows for a fast extension of the second platform in the axial direction. Hence, when the working surface is needed, then the workers can for example rotate the second platform from the parked, stowed position to the extended position and lock the second platform at the extended position, i.e. the position when the second platform extends substantially in the axial direction. This considerably reduces the installation time, as the second platform can be much faster installed than with a removable platform. Additionally, the second platform is not hoisted from the ground to the hub, as the second platform is stowed at the first platform during the operation of the wind turbine, which also reduces installation costs by reducing the installation time and avoiding the use of a crane for hoisting.

According to another embodiment of the invention, the platform assembly comprises a telescopic system for moving the second platform from a stowed position to an extended position, in which the surface of the second platform extends substantially in the axial direction. The telescopic system comprises a slidable telescopic surface member being slidable from a stowed position to an extended position, thereby increasing the surface of the second platform.

According to another embodiment of the invention, the second platform telescopic system comprises a telescopic arm and a telescopic surface member.

The telescopic system comprises at least one telescopic surface member mounted so as to be telescopically slidable from the stowed position, where it is stacked over, under or in front of the first platform, to the extended position, where it extends in the axial direction.

The telescopic system comprises a first telescopic surface member and a second telescopic surface member mounted so as to be telescopically slidable relative to each other in the axial direction.

The first telescopic surface member is arranged to encompass the second telescopic surface member in the stowed position.

The first telescopic surface member is arranged to be stacked over or under the second telescopic surface member in the stowed position.

The advantage of having two telescopic surface member slidable relative to each other is that the working surface of the second platform greatly increases by sliding the telescopic surface and thereby extending the working surface of the platform assembly in the axial direction.

The telescopic system comprises a plurality of telescopic surface members mounted so as to be telescopically slidable relative to each other in the axial direction. This has the advantage that the axial extension of the working surface increases by each telescopic surface member of the telescopic system and at the same time, this allows to greatly reduce the working surface in the stowed position, as the telescopic surface members can be stacked on each other, thereby greatly reducing the surface of the second platform in the stowed position.

The telescopic system comprises a telescopic arm coupled to the telescopic surface member. The telescopic arm can comprise a plurality of hollow cylinders stack on each other which can slide relative to each other and increase the length of the telescopic arm.

With the use of an actuator system, the telescopic arm can extend from the stowed position to the extended position, thereby also sliding the telescopic surface member the telescopic arm is attached to and thereby increasing the surface of the telescopic system.

According to another embodiment of the invention, the platform assembly comprises a rotating system for rotating the second platform relative to the first platform. For example, the second platform can have one edge pivotally connected to the first platform. This allows to rotate the second platform from the stowed position, where the second platform is stacked over or under the first platform, or also within the first platform, to the extended position, thereby increasing the working surface of the platform assembly in the axial direction. The rotating system has the advantage that it reduces the time for the extension of the platform assembly from the stowed position to the extended position compared to systems where the second platform has to be connected to the first platform.

According to another embodiment of the invention, the rotating system comprises a hinge or a pin joint for the rotational movement. The hinge or pin joint can be coupled to the first and to the second platform by means of a bushing. For example, the hinge or pin joint can be coupled to an edge of first platform and to an edge of the second platform to pivotally couple the second platform to the first platform.

According to another embodiment of the invention, the rotating system comprises a lock pin and a lock socket for securing the second platform in a stowed position and/or in a rotated position. The lock pin is a pin with a smaller diameter than the lock socket and which can be introduced in the lock socket to secure the lock pin to the lock socket, thereby securing the components attached to this locking system together.

The lock pin is coupled to the second platform and the lock socket is coupled to the first platform to lock the second platform to the first platform.

The lock pin is coupled to the first platform and the lock socket is coupled to the second platform to lock the second platform to the first platform.

One lock pin is coupled to the second platform and two lock sockets are coupled to the first platform. In the stowed position, the lock pin of the second platform is secured at the first lock socket of the first platform, thereby securing the second platform to the first platform at this position. When the lock pin is released from the first lock socket in order to rotate the second platform relative to the first platform, then the lock pin turns for example by 90° about the axis of the hinge or pin joint to the rotated position, which is the position where the second platform extends in the axial direction. At this position, the second lock socket of the first platform can be positioned so that the lock pin of the second platform can engage with the second lock socket of the first platform to secure the second platform to the first platform in the rotated position.

One lock socket is coupled to the second platform and two lock pins are coupled to the first platform. In the stowed position, the lock socket of the second platform is secured at the first lock pin of the first platform, thereby securing the second platform to the first platform at this position. When the first lock pin is released from the lock socket in order to rotate the second platform relative to the first platform, then the lock socket of the second platform turns for example by 90° about the axis of the hinge or pin joint to the rotated position, which is the position where the second platform extends in the axial direction. At this position, the second lock pin of the first platform can be positioned so that the lock socket of the second platform can engage with the second lock pin of the first platform to secure the second platform to the first platform in the rotated position.

According to another embodiment of the invention, the rotating system comprises a spring. The spring pulls the second platform towards the first platform, so that it helps to lock the second platform to the first platform, as the pulling of the second platform towards the first platform by means of the spring reduces the force needed by the worker to pull the second platform towards the first platform in order to lock the two platforms together, for example by means of the lock pin lock socket system.

In order to rotate the second platform relative to the first platform, the second platform is pushed against the force of the spring, which releases the lock pin from the lock socket and decouples the locking system. Then, the second platform is rotated to the rotated position. At last, the second platform is released and the force of the spring brings the second platform towards the first platform and the lock pin and lock socket are brought together by the force of the spring, thereby locking the second platform to the first platform.

The spring can lay against or be supported by a bushing or a nut attached to the first or to the second platform. The use of a spring has the advantage that it levels the second platform with the first platform and helps to secure both platforms together, thereby increasing the safety of the platform assembly.

According to another embodiment of the invention, the platform assembly has a first state, in which the second platform is decoupled from the first platform or stowed on, below or in front of the first platform to limit the surface of the platform assembly inside the hub, particularly when the hub is rotating. The first state is the parked state of the platform assembly.

Having a decoupled or stowed second platform reduces the surface of the platform assembly within the hub, thereby allowing the platform assembly to be parked in the hub without having to remove the platform assembly during the operation of the wind turbine. Hence, at least the first platform of the platform assembly can be left parked in the hub in the first state while the hub is rotating.

In the first state, the surface of the platform assembly extending in the axial direction is minimized.

According to another embodiment of the invention, the first platform is moveable between a horizontal and a vertical position, particularly when the platform assembly is in the first state.

In the horizontal position, the working surface of the first platform extends in a direction parallel to the ground. Hence, the normal vector of the working surface is parallel to the gravitational force vector. In this position, workers can walk on the working surface of the first platform.

In the vertical position, the working surface of the first platform extends in a direction perpendicular to the ground. Hence, the normal vector of the working surface is perpendicular to the gravitational force vector.

In the first state, the platform assembly can be parked in a horizontal position or in a vertical position depending on the rotating components of the hub and to avoid collisions between the platform assembly and these rotating components. The chosen position of the first state depends on the hub design and on the rotating components of the hub, but both positions or an intermediary position between both positions can be used as the parked positions or as the first state of the platform assembly.

If the second platform is stacked or stowed together with the first platform, then the second platform is moveable between the horizontal and the vertical position as well. Hence, the platform assembly is moveable between the horizontal and the vertical position.

According to another embodiment of the invention, the platform assembly has a second state, in which the second platform is coupled to the first platform, wherein the second platform extends in the axial direction to increase the working surface inside the hub.

Hence, in a first state, the platform assembly's working surface extends substantially in the direction perpendicular to the axial direction, as this is the direction in which the first platform extends. In a second state, the working surface extends both in the direction perpendicular to the axial direction due to the first platform and in the direction parallel to the axial direction due to the second platform in the extended state.

According to another embodiment of the invention, the second platform comprises a platform support configured to support the platform in the second state. The platform support supports the second platform in the second state on the hub. Hence, the platform support is arranged between the hub and the second platform. As the hub is not rotating in the second state of the platform assembly, the platform assembly can be supported directly on the hub. Hence, the platform assembly is both supported on the hub and on the hub access structure, which increases the stability of the platform assembly.

The platform support can also be arranged between the platform assembly and the blade bearing reinforcement plate or between the platform assembly and the pitch lock.

According to another embodiment of the invention, the platform assembly has a third state, in which the platform assembly is moved at a tilting angle between a horizontal and a vertical position in order to rotate the hub without colliding the hub with the platform assembly. At this position, collisions between the rotating hub and the platform assembly with the second platform in the extended state can be avoided. This is particularly useful, as the platform assembly can then reach the three blade bearings by rotating the hub without having to switch at each rotation to the first state.

In the third state, the platform is not supported on the rotating hub, hence if a platform support is used which is arranged between the rotating hub and the platform assembly, then it should be removed before turning the hub.

The platform assembly at the third state is advantageous in order to turn the hub from one blade bearing to the next one by 120° about the axial direction without the platform assembly colliding with other rotating components of the hub. Hence, when the blade bearing installation works or maintenance works of the first blade bearing are completed, then the platform support is removed and the platform assembly is moved from the second state to the third state. After this, the hub is rotated by 120° to have the second blade bearing located next to the platform assembly. Then, the platform assembly is moved from the third state to the second state and the platform support is attached to the platform assembly. At this point, the blade bearing installation works or maintenance works can start on the second blade bearing. The same process is done for the third blade bearing.

This is advantageous, as it considerably reduces the installation time compared to switching from the second state to the first state when the hub is to be rotated to reach the next blade bearing. Hence, the second platform does not need to be decoupled or stacked together with the first platform in the first state in order to rotate the hub when the platform assembly is at the third state. The third state is a temporary position which allows a fast installation or service of the blade bearings and allows the hub to rotate freely without colliding with any parts of the platform assembly.

According to another embodiment of the invention, the platform assembly further comprises rails. Rails increase the safety of a platform by stopping workers or e equipment from falling down the edge of the platform.

The rails can be detachable rails, which are detached when the platform assembly is in the first state and attached when the platform assembly is in the second and/or in the third state. It is advantageous to detach the rails when the platform is in the first state to reduce the volume taken by the platform assembly during the operation of the wind turbine, thereby reducing the risk of collisions between the rotating parts of the hub and the platform assembly.

The detachable rails can be attached to the first platform and/or to the second platform.

According to another embodiment of the invention, the platform assembly further comprises a damper configured to absorb shock impulses. The use of a damper is useful for moving the platform assembly from a vertical to a horizontal position or from the third state to the horizontal position, as it absorbs the shocks and slows down the rotation between these positions. It also allows the workers to rotate the platform assembly with less effort. The damper also dampens and stabilizes the platform assembly when workers walk on the walking surface and offers a further support for the stability of the platform.

The damper can be a shock absorber, such as a gas or hydraulic spring or a mechanical spring.

The damper also stabilizes the platform assembly at the third state and keeps the platform assembly at the tilting angle during the third state.

The damper can be a retractable damper installed or releasably connected between a rotating component of the hub, such as the hub itself or the main bearing reinforcement plate, and the first platform or the second platform of the platform assembly.

The damper can also be a fixed component installed between two stationary parts, such as between the hub access structure and the first platform of the platform assembly. This has the advantage that the damper does not need to be detached from the platform assembly when the hub rotates.

According to another embodiment of the invention, the platform assembly is supported in the horizontal position on the main bearing or on the main bearing reinforcement plate by means of a support bracket.

According to another embodiment of the invention, the support bracket comprises a support bracket pin and a support bracket socket. The support bracket pin can be coupled to the platform assembly and the support bracket socket can be coupled to the main bearing reinforcement plate. The use of a support bracket to support the platform assembly increases the stability of the platform assembly and helps securing the platform assembly to the main bearing when the first platform is in a horizontal position.

In order to lock the support bracket pin to the support bracket socket, the platform assembly can be moved from the vertical position to the horizontal position, thereby automatically introducing the support bracket pin in the support bracket socket.

After supporting the platform assembly by means of the support bracket, the second platform of the platform assembly can be extended in axial direction to the second state. Through the support bracket, the platform assembly is secured for workers to work on the working surface of the platform assembly when the platform assembly or at least the first platform of the platform assembly is at the horizontal position.

The main bearing reinforcement plate is usually in a tilted position, i.e. at a specific angle from the vertical position. This feature can be used to avoid collisions between the support bracket pin and the support bracket socket when the main bearing and the hub rotates in which the platform assembly is parked at the vertical position during the operation of the wind turbine. Due to the tilting of the main bearing reinforcement plate, there is a clearance between the support bracket pin coupled to the platform assembly and the support bracket socket coupled to the main bearing reinforcement plate, which allows the main bearing to rotate without colliding with the platform assembly or with the support bracket pin.

Hence, it is advantageous to have the platform assembly in the vertical position at the parked state or first state of the platform assembly particularly when the main bearing reinforcement plate is tilted. At the parked state of the platform assembly, the wind turbine can freely rotate in an operation mode without colliding with the platform assembly.

The support bracket can be a built-in support bracket, wherein a part of the support bracket is attached to the main bearing or to the main bearing reinforcement plate and another part of the support bracket is attached to the platform assembly. This has the advantage that workers do not have to move any parts in order to fix the platform assembly to the main bearing, the parts can be coupled together by rotating the platform assembly from the vertical to the horizontal position.

Yet another aspect of the invention is a method for increasing the working surface inside the hub by means of a platform assembly comprising a first platform coupled to a hub access structure and a second platform coupled to the first platform, wherein the platform assembly has a first state, in which the second platform is stowed on, below or in front of the first platform and a second state, wherein the second platform extends in the axial direction to increase the working surface inside the hub, wherein the platform assembly comprises a rotating system. The method comprises the step of rotating the second platform relative to the first platform from the first state to the second state.

This method allows to increase the axial surface of the platform assembly to be able to reach the blade bearings by the platform assembly.

According to another aspect of the invention, the platform assembly has a third state, in which the platform assembly is moved at a tilting angle between a horizontal and a vertical position and the method further comprises the step of rotating the platform assembly from the second state to the third state.

This allows to rotate the hub to be able to reach the next blade bearing during maintenance or installation works.

BRIEF DESCRIPTION

Some of the embodiments will be described in detail, with reference to the following figures, wherein like designations denote like members, wherein:

FIG. 20 shows the telescopic system of the platform assembly used for extending the working surface of the second platform;

FIG. 21 shows the telescopic system of the platform assembly used for extending the working surface of the second platform;

DETAILED DESCRIPTION

Figure 1:
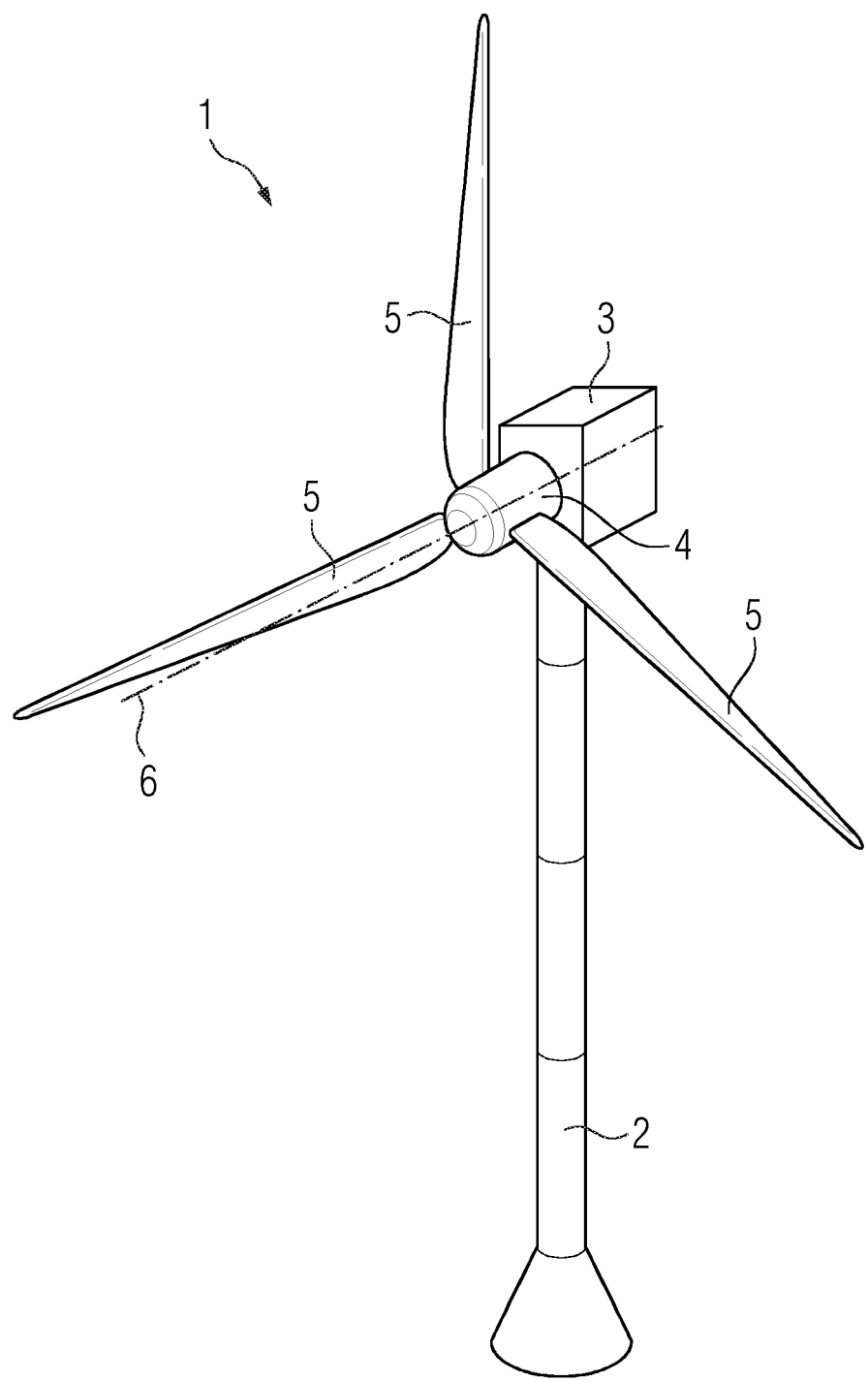
FIG. 1 shows a perspective view of a wind turbine.

FIG. 1 shows a wind turbine 1 comprising a tower 2, a nacelle 3 arranged at an upper end of the tower 2, a hub 4 connected to the nacelle 3 and three blades 5 extending from the hub 4. The wind turbine 1 has an axial direction 6, which is the direction along the axis of rotation of the wind turbine 1.

Figure 2:
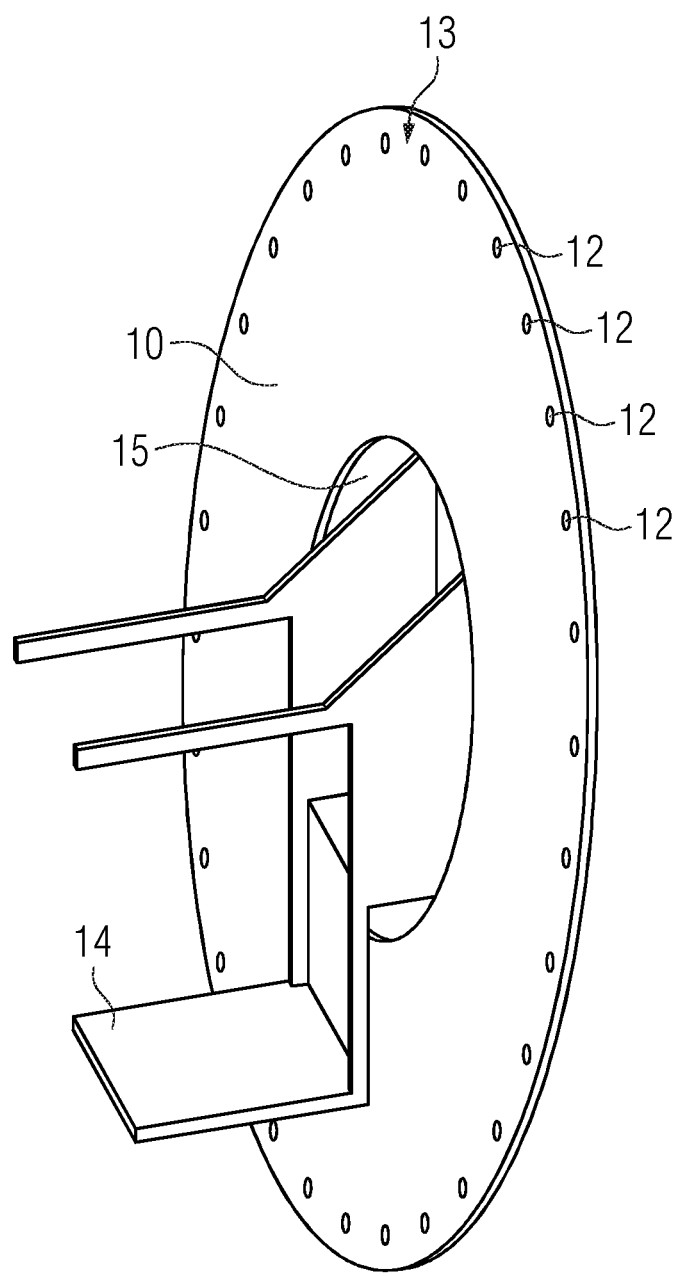
FIG. 2 shows a hub access structure passing through the main bearing reinforcement plate opening allowing workers to gain access between the main bearing and the hub.

FIG. 2 shows a hub access structure 14 passing through the main bearing reinforcement plate opening 15 allowing workers to gain access between the main bearing and the hub 4.

The main bearing reinforcement plate opening 15 rotates with the rotation of the hub 4 and the hub access structure 14 is a stationary component and therefore does not rotate about the axial direction 6 of the wind turbine 1 during the operation of the wind turbine 1. Hence, the hub access structure 14 passes through the main bearing reinforcement plate opening 15 so that there is no contact between the hub access structure 14 and the main bearing reinforcement plate 10. This arrangement allows the hub access structure 14 to be kept during the operation of the wind turbine 1 as it does not have to be detached from the nacelle 3 because it does not hinder the rotation of the hub 4.

Figure 3:
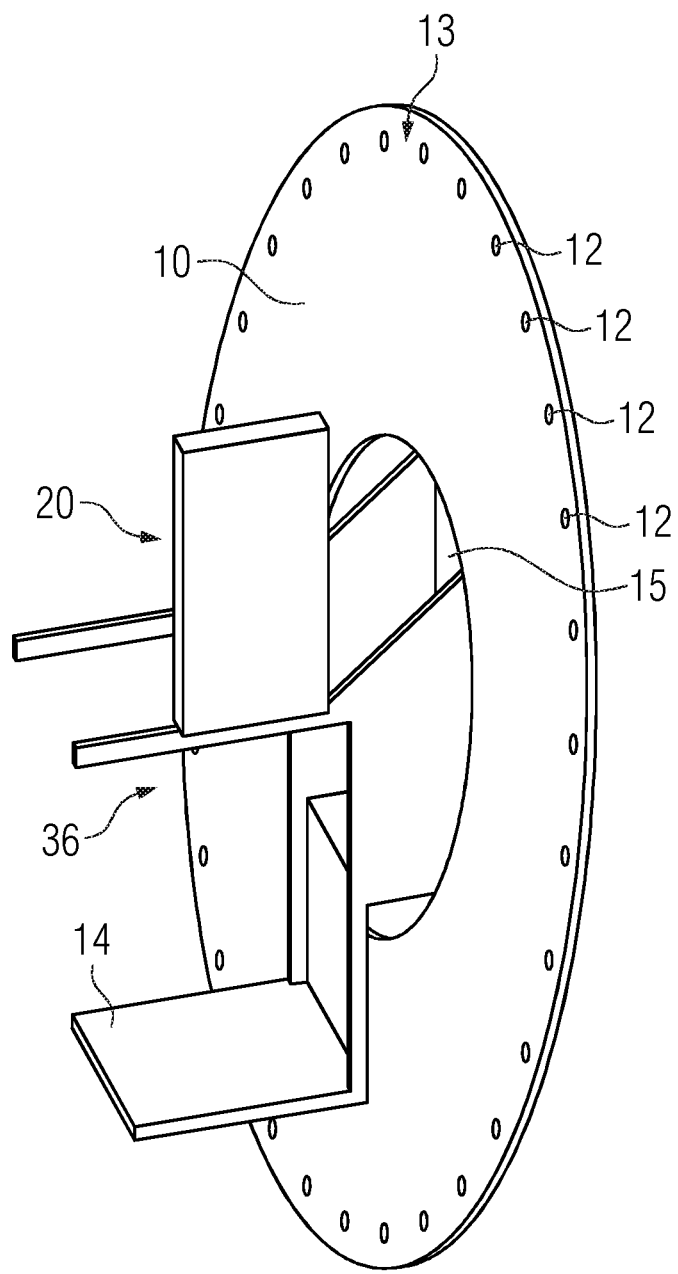
FIG. 3 shows the hub access structure of FIG. 2, wherein a first platform of a platform assembly is coupled at the hub access structure, the platform assembly being rotatably fixed to the hub access structure.
Figure 4:
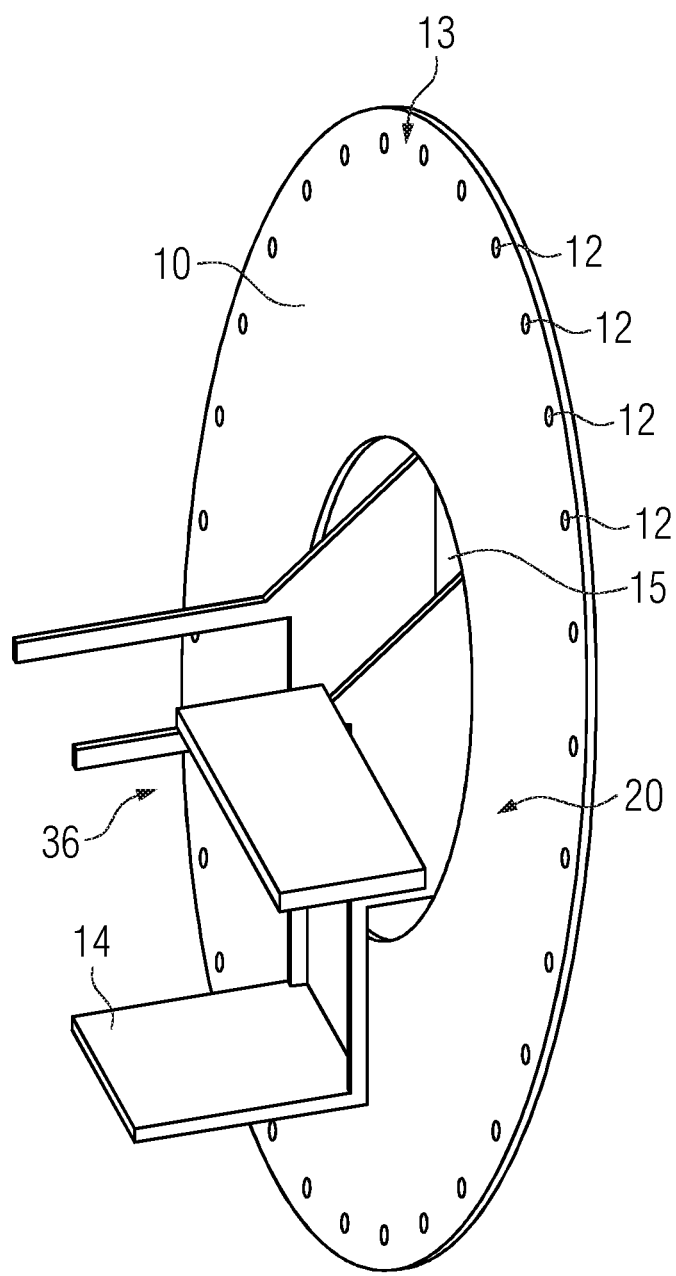
FIG. 4 shows the hub access structure of FIG. 2, wherein a first platform of a platform assembly is coupled at the hub access structure, the platform assembly being rotatably fixed to the hub access structure.

FIGS. 3 and 4 show the hub access structure 14 of FIG. 2, wherein a first platform 21 of the platform assembly 20 is coupled at the hub access structure 14, the platform assembly 20 being rotatably fixed to the hub access structure 14.

The first platform 21 provides a walking surface for workers to do maintenance or installation works at the main bearing or at the main bearing reinforcement plate 10, such as the tightening of fastening means 12 of the fastening means circle 13 or the replacement of lubricant.

As the first platform 21 is stationary, the main bearing can be rotated in order to reach all the fastening means 12 of the fastening means circle 13 of the main bearing, thereby avoiding installing a large platform assembly 20 at the hub access structure 14. Hence, it suffices that the first platform 21 extends in a direction substantially perpendicular to the axial direction 6, i.e. along the radius of the main bearing reinforcement plate 10, from the hub access structure 14 to the radial location of the fastening means circle 13 to reach all the fastening means 12 on the fastening means circle 13. Once the worker finishes with the service of the fastening means 12 in the section which can be reached by the platform assembly 20, the main bearing can be turned so that the worker can reach the next section of fastening means 12 in the fastening means circle 13 without having to relocate the platform assembly 20.

FIGS. 3 and 4 show the vertical and horizontal position of the platform assembly 20. The switching between both positions can be done by a rotating system 36 such as hinges. Both positions can be the parked state or first state 27 of the platform assembly 20. The chosen position of the first state 27 depends on the hub 4 design and on the rotating components of the hub 4 and the one or the other or an intermediate position between both positions can be chosen as the parked state or first state 27 to avoid collisions between the platform assembly 20 and rotating parts of the hub 4.

Figure 5:
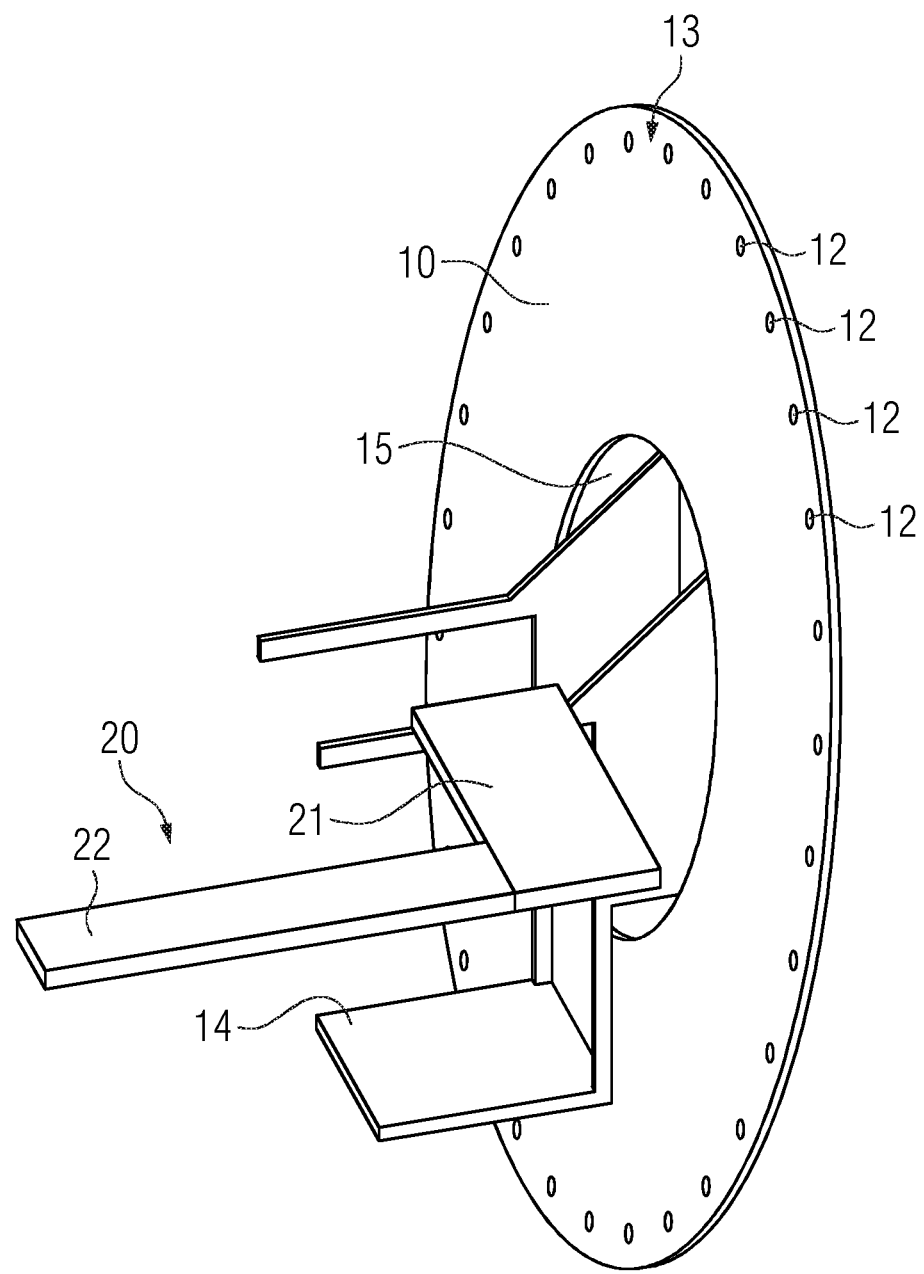
FIG. 5 shows the hub access structure of FIG. 2, wherein the platform assembly comprises a first platform and a second platform being coupled to the first platform.

FIG. 5 shows the hub access structure 14 of FIG. 2, wherein the platform assembly 20 comprises a first platform 21 and a second platform 22 being coupled to the first platform 21.

The second platform 22 increases the working surface of the platform assembly 20 and allows workers to reach the blade bearings from the platform assembly 20.

Figure 6:
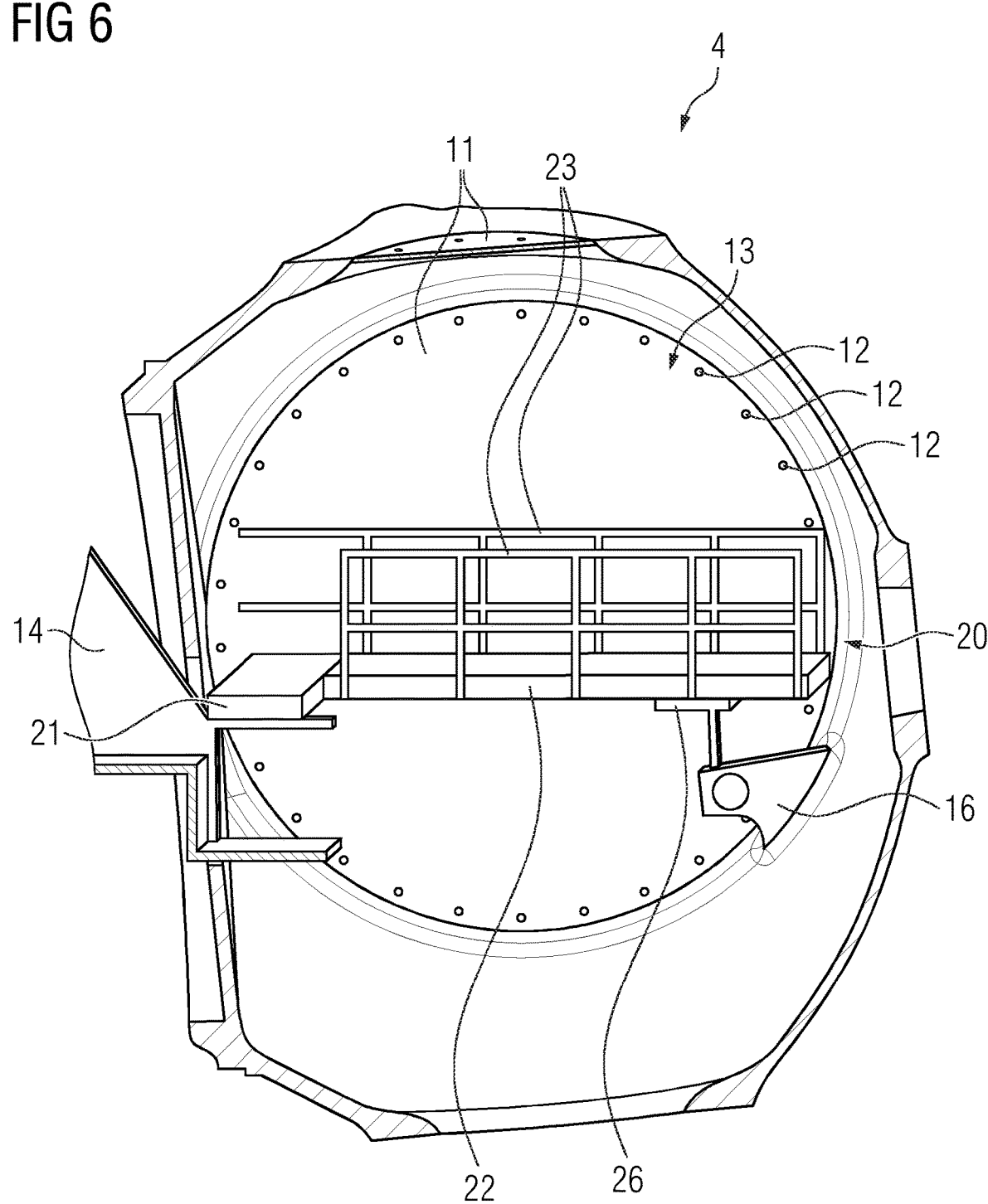
FIG. 6 shows the platform assembly of FIG. 5 from another perspective view, wherein at the platform assembly rails are installed and the platform assembly is supported by a platform support.

FIG. 6 shows the platform assembly 20 of FIG. 5 from another perspective view, wherein at the platform assembly 20 rails 23 are installed and the platform assembly 20 is supported by a platform support 26. The platform assembly 20 is at the second state 28, in which the second platform 22 is coupled to the first platform 21 and extends in the axial direction 6 to increase the working surface inside the hub 4.

As can be seen here, workers can reach the blade bearing and do maintenance works or installation works on the blade bearing or on the blade bearing reinforcement plate 11 by walking on the working surface of the platform assembly 20. To increase the security of the platform assembly 20, rails 23 are installed, which can be detached afterwards.

The platform assembly 20 is supported by a platform support 26 installed between the pitch lock 16 of the blade bearings and the second platform 22 of the platform assembly 20.

Figure 7:
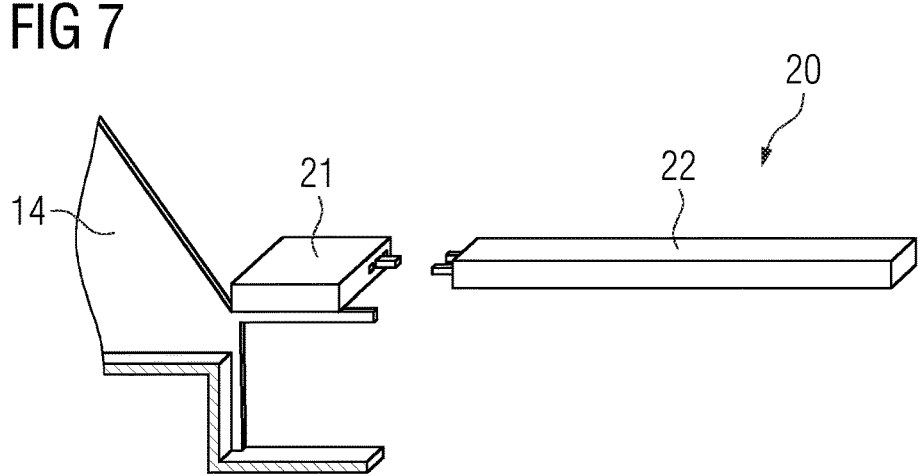
FIG. 7 shows the coupling of the second platform of the platform assembly, which is achieved by means of a pin coupling.

To reduce the working surface of the platform assembly 20 extending in axial direction 6, the second platform 22 can be decoupled from the first platform 21, as seen in FIG. 7. The coupling is done by a pin coupling.

Figure 8:
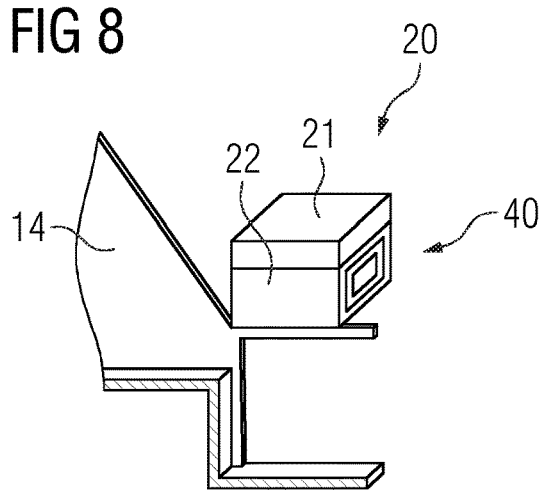
FIG. 8 shows the second platform being stacked under the first platform and having a telescopic system for extending the second platform in the axial direction.
Figure 9:
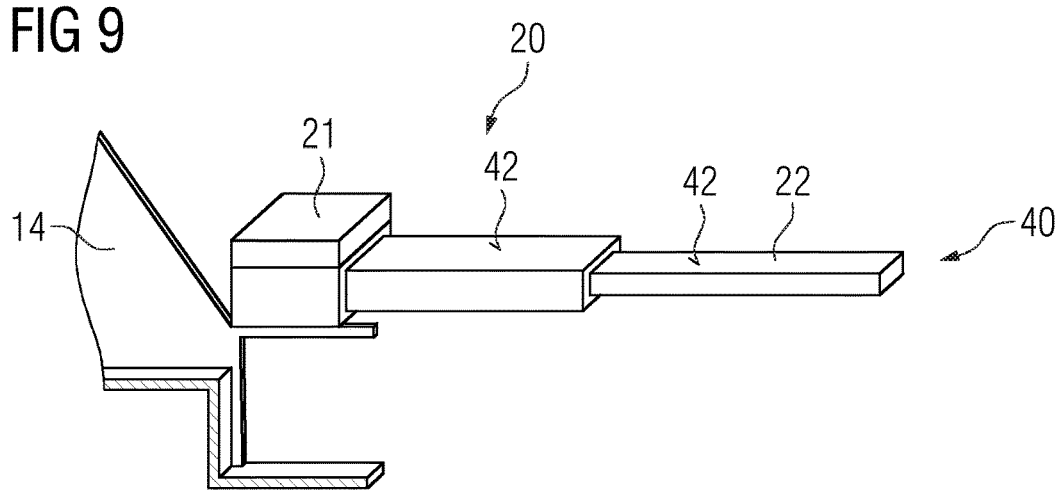
FIG. 9 shows the second platform being stacked under the first platform and having a telescopic system for extending the second platform in the axial direction.

Another alternative to reduce the working surface of the platform assembly 20 is to stack the second platform 22 under the first platform 21, as seen in FIGS. 8 and 9. In these Figures, a telescopic system 40 comprising a plurality of telescopic surface members 42 allows to increase the working surface of the platform assembly 20.

FIGS. 10 to 17 show a second platform 22 being stacked under the first platform 21, wherein the platform assembly 20 comprises a rotating system 36, a locking system and a telescopic system 40.

Figure 10:
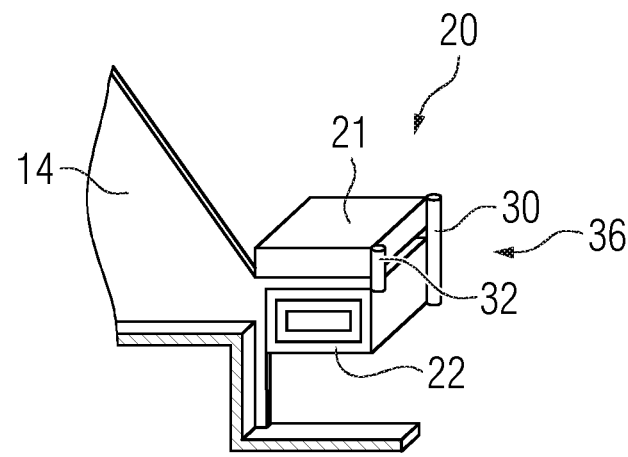
FIG. 10 shows a second platform being stacked under the first platform, wherein the platform assembly comprises a rotating system, a locking system and a telescopic system.

In FIG. 10, the second platform 22 is stowed under the first platform 21 and secured by a lock pin 31 and a lock socket 32, which cannot be seen in this perspective. This Figure shows the platform assembly 20 in its first state 27.

Figure 11:
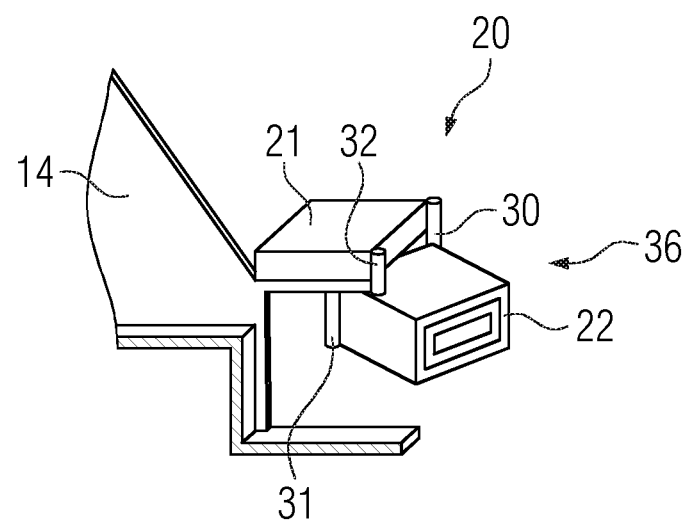
FIG. 11 shows a second platform being stacked under the first platform, wherein the platform assembly comprises a rotating system, a locking system and a telescopic system.
Figure 12:
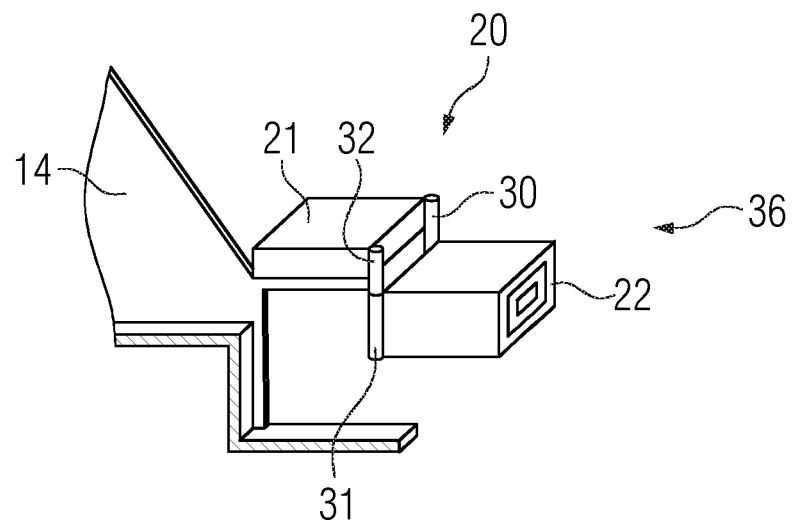
FIG. 12 shows a second platform being stacked under the first platform, wherein the platform assembly comprises a rotating system, a locking system and a telescopic system.
Figure 13:
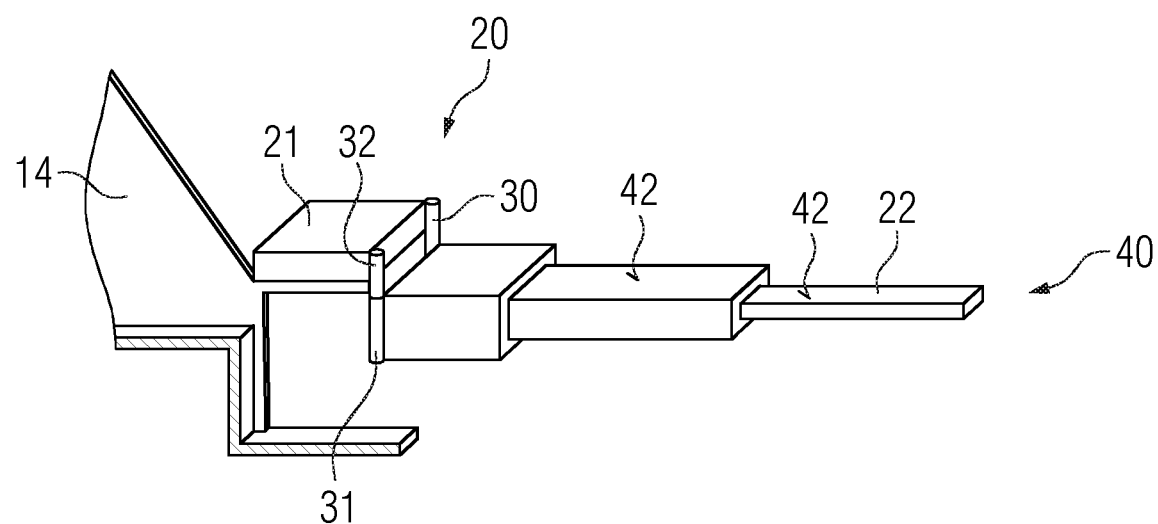
FIG. 13 shows a second platform being stacked under the first platform, wherein the platform assembly comprises a rotating system, a locking system and a telescopic system.
Figure 14:
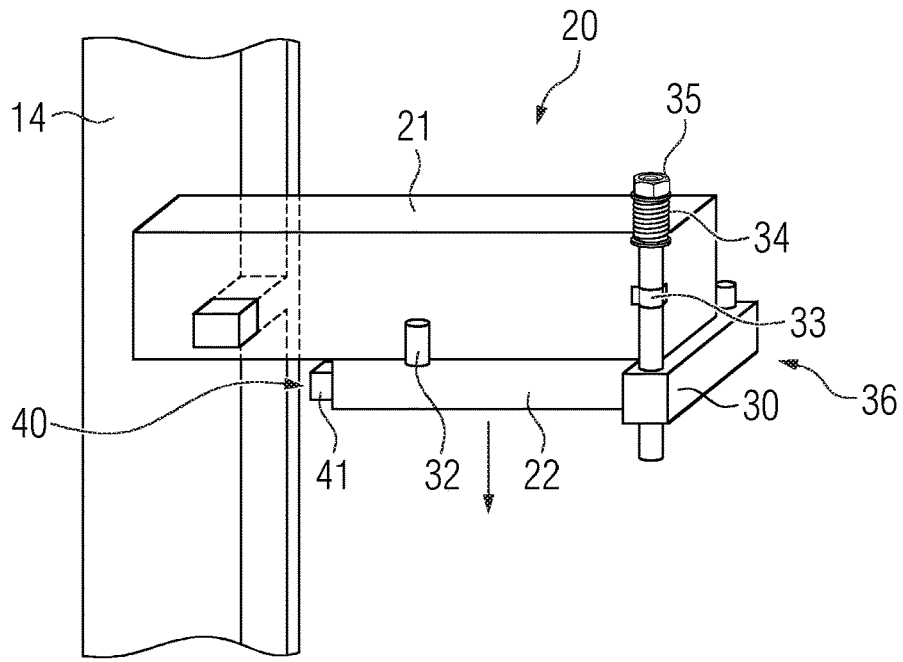
FIG. 14 shows a second platform being stacked under the first platform, wherein the platform assembly comprises a rotating system, a locking system and a telescopic system.
Figure 15:
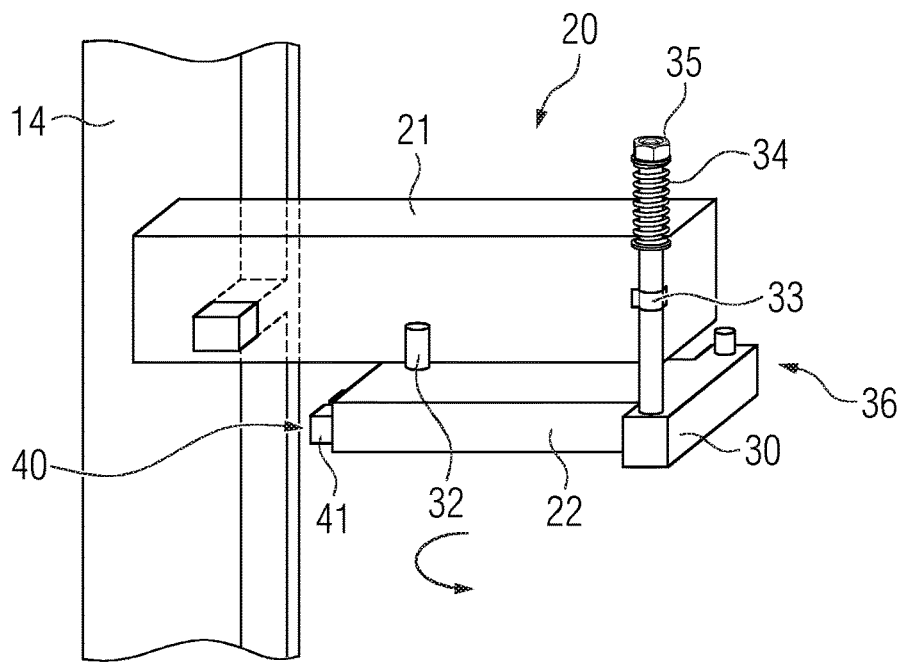
FIG. 15 shows a second platform being stacked under the first platform, wherein the platform assembly comprises a rotating system, a locking system and a telescopic system.
Figure 16:
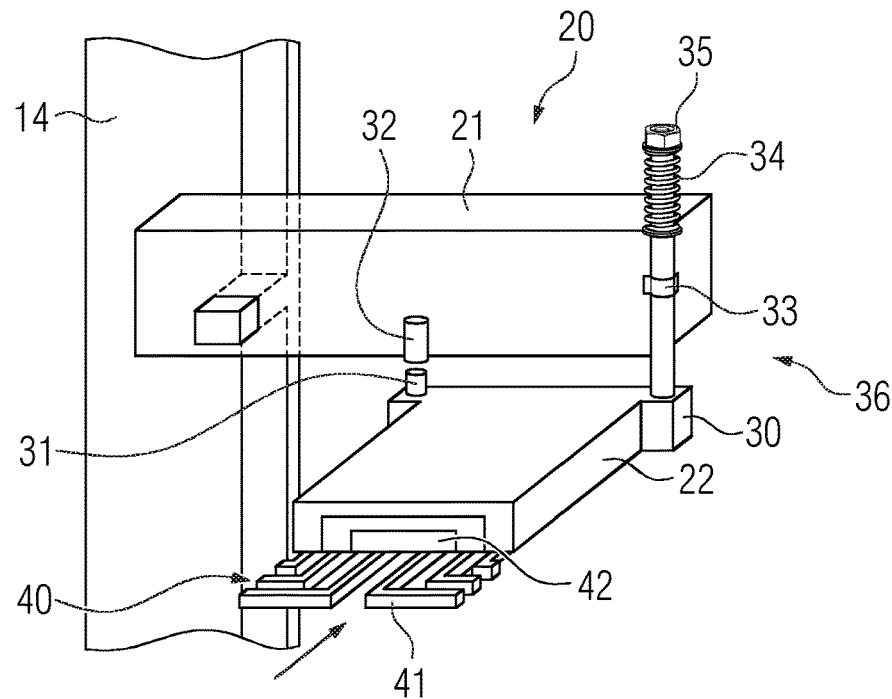
FIG. 16 shows a second platform being stacked under the first platform, wherein the platform assembly comprises a rotating system, a locking system and a telescopic system.
Figure 17:
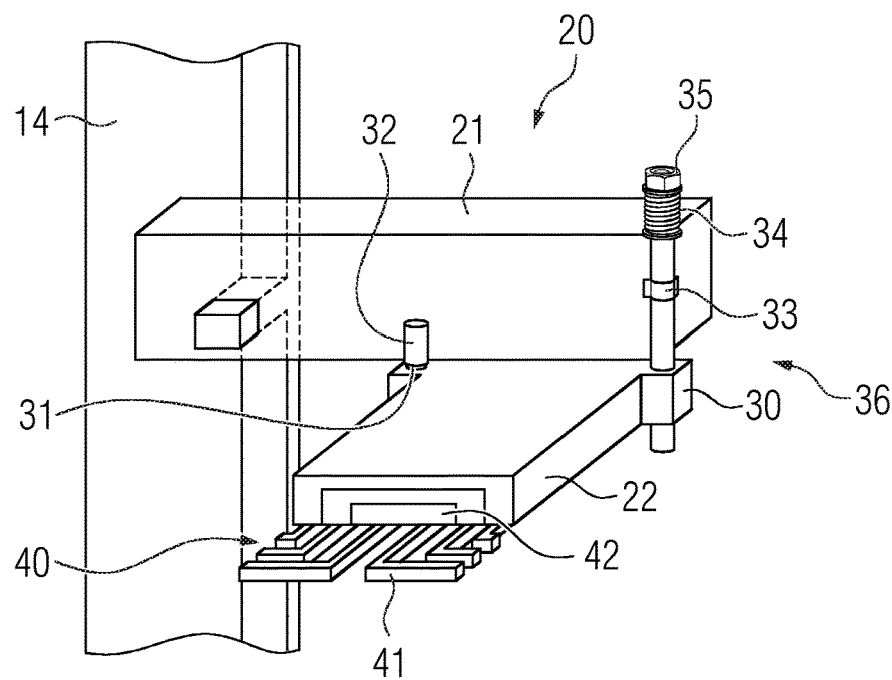
FIG. 17 shows a second platform being stacked under the first platform, wherein the platform assembly comprises a rotating system, a locking system and a telescopic system.
Figure 18:
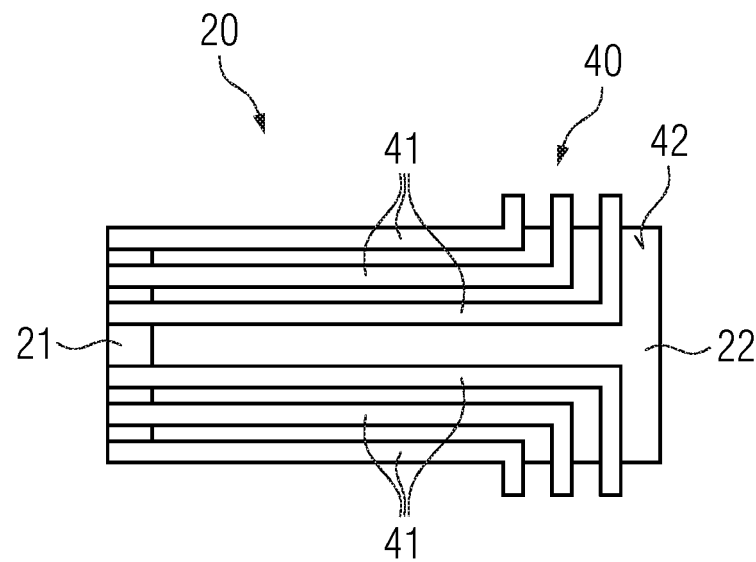
FIG. 18 shows the telescopic system of the platform assembly used for extending the working surface of the second platform.
Figure 19:
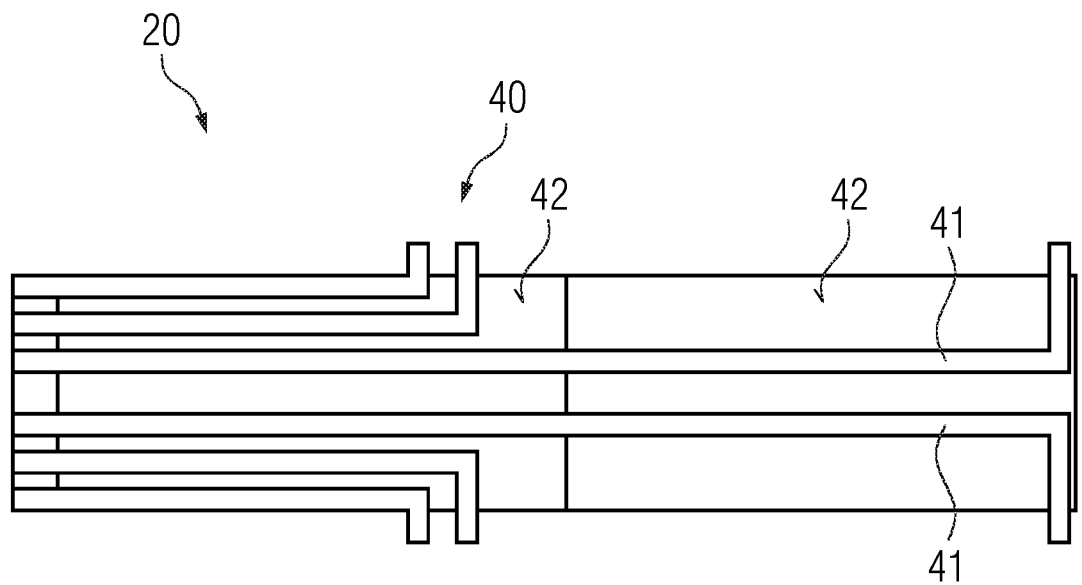
FIG. 19 shows the telescopic system of the platform assembly used for extending the working surface of the second platform.

FIGS. 11 to 13 show the transition of the platform assembly 20 from the first state 27 to the second state 28, in which the rotating system 36 allows to rotate the second platform 22 relative to the first platform 21 by means of a hinge 30. Hence, the second platform 22 is pivotably connected to the first platform 21 such that the second platform 22 rotates between a first position where the second platform 22 is disposed below the first platform 21 and a second position where the second platform 22 is in front of the first platform 21 and extends the working surface of the platform assembly 20 in the axial direction 6.

To further extend the working surface of the platform assembly 20 in the axial direction 6, the platform assembly 20 can comprise a telescopic system as shown in FIG. 13 with telescopic surface members 42.

FIGS. 14 to 17 show a detailed view of the rotation of the second platform 22 relative to the first platform 21 of the platform assembly 20 by means of a rotating system 36.

The first platform 21 is rigidly coupled to the hub access structure 14. The second platform 22 is pivotably coupled to the first platform 21 by means of a hinge 30 supported by a bushing 33.

The rotating system 36 comprises a spring 34 supported by a nut 35 at the hinge 30. The spring 34 pulls the second platform 22 towards the first platform 21.

The use of a spring 34 together with a lock system comprising a lock pin 31 and a lock socket 32 allows to keep the second platform 22 secured to the first platform 21 at the first state 27, second state 28 and third state 29 of the platform assembly 20. This is so because the spring 34 constantly pulls the second platform 22 against the first platform 21.

In order to rotate the second platform 22 relative to the first platform 21, the second platform 22 is pushed against the force of the spring 34, which releases the lock pin 31 from the lock socket 32 and decouples the locking system. Then, the second platform 22 is rotated to the rotated position. At last, the second platform 22 is released and the force of the spring 34 brings the second platform 22 towards the first platform 21 and the lock pin 31 and lock socket 32 are brought together by the force of the spring 34, thereby locking the second platform 22 to the first platform 21.

As seen in the Figures, the second platform 22 has the lock pin 31 and the first platform 21 the lock socket 32, but the other way around is also possible.

The lock socket 32 is an aperture configured to receive the lock pin 31. The lock pin 31 is a cylindraceous member having a longitudinal axis, a side surface, and first and second ends, The lock pin 31 is configured to fit in the lock socket 32.

The platform assembly 20 further comprises a telescopic system 40 arranged at the second platform 22, allowing the second platform 22 to extend and increase the working surface by means of telescopic surface members 42 and telescopic arms 41. This telescopic system 40 rotates together with the second platform 22 and is stack together with the second platform 22 in the first state 27 of the platform assembly 20.

FIGS. 18 to 21 show the telescopic system 40 of the platform assembly 20 used for extending the working surface of the second platform 22.

The telescopic system 40 comprises a plurality of telescopic arms 41 coupled to a plurality of telescopic surface member 42. By pulling the telescopic arms 41 of each telescopic surface member 42, the telescopic surface member 42 slides and extends the working surface of the second platform 22. In this case, with four telescopic surface members 42, the working surface of the second platform 22 is quadruplicated from FIG. 18 to FIG. 21.

Figure 22:
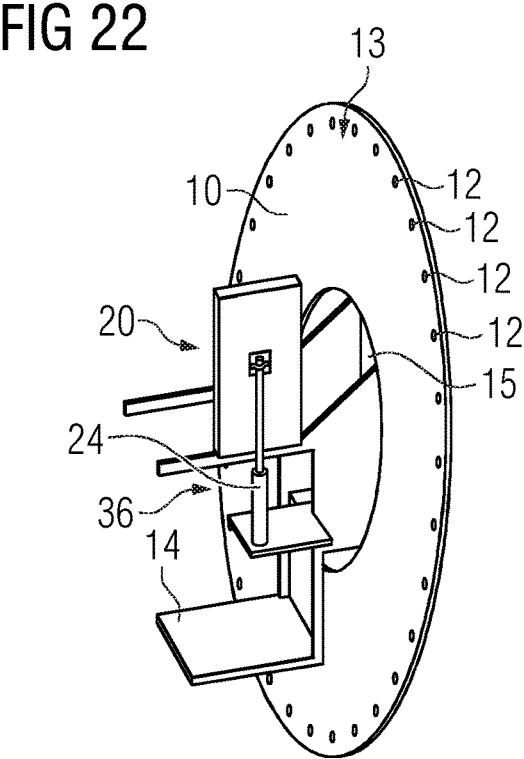
FIG. 22 shows the platform assembly in the parked position or in the first state installed at the hub access structure comprising a damper installed between the platform assembly and the hub access structure.

FIG. 22 shows the platform assembly 20 in the parked position or in the first state 27 installed at the hub access structure 14 comprising a damper 24 installed between the platform assembly 20 and the hub access structure 14. The platform assembly 20 is in the vertical position.

By arranging the damper 24 between the platform assembly 20 and the hub access structure 14, which are both stationary components, this has the advantage that the damper 24 does not have to be removed during the operation of the wind turbine 1.

Figure 23:
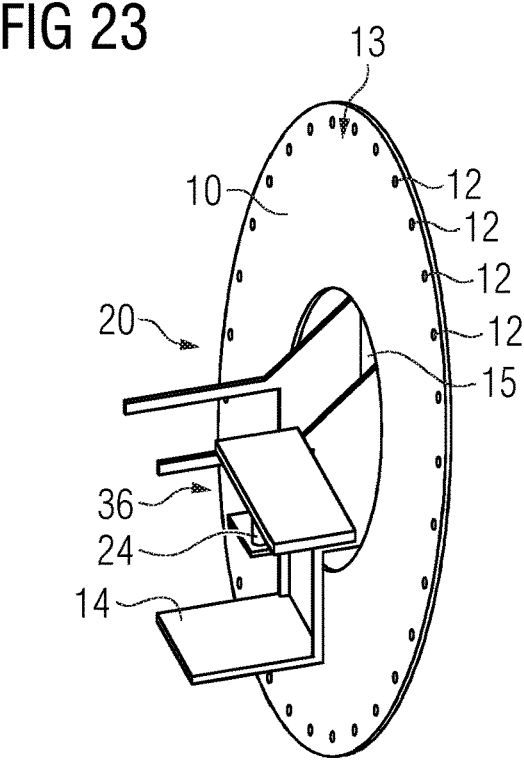
FIG. 23 shows the platform assembly with a damper installed between the platform assembly and the hub access structure in a horizontal position.

FIG. 23 shows the platform assembly 20 with damper 24 installed between the platform assembly 20 and the hub access structure 14 in a horizontal position. The damper 24 eases the rotation of the platform assembly 20 from the horizontal position to the vertical position and for the vertical position to the horizontal position.

Figure 24:
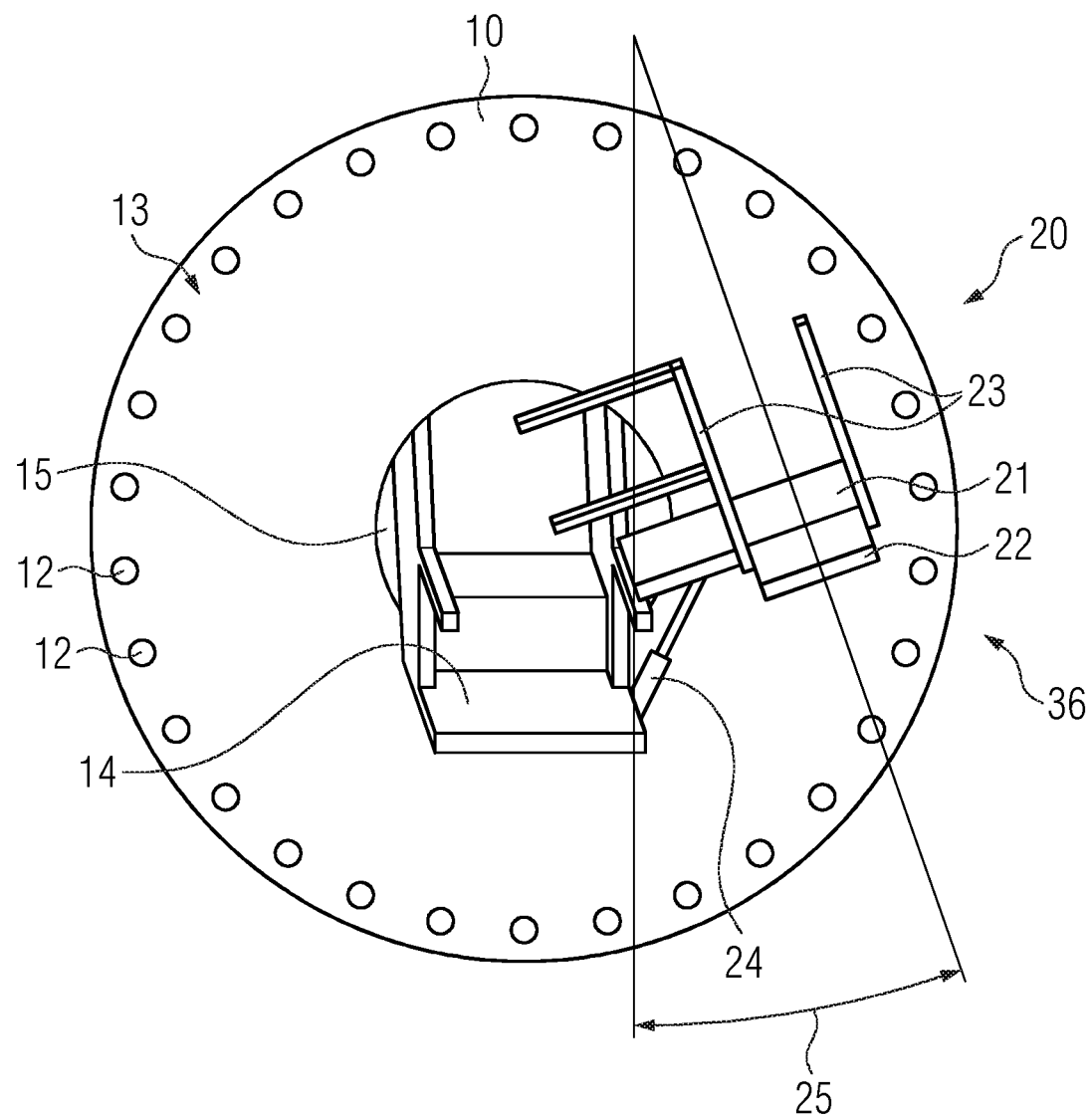
FIG. 24 shows the platform assembly in the third state at the tilting angle.

FIG. 24 shows the platform assembly 20 in the third state 29 at the tilting angle 25. This is the position of the platform assembly 20 during the installation or the maintenance of the blade bearings, where the platform assembly 20 is secured in this temporary position to be able to rotate the hub 4 without having components of the hub 4 colliding with the platform assembly 20.

The rails 23 can be left attached to the platform assembly 20 in this position, which reduces the installation time.

The platform assembly 20 is supported in this position by the damper 24.

Figure 25:
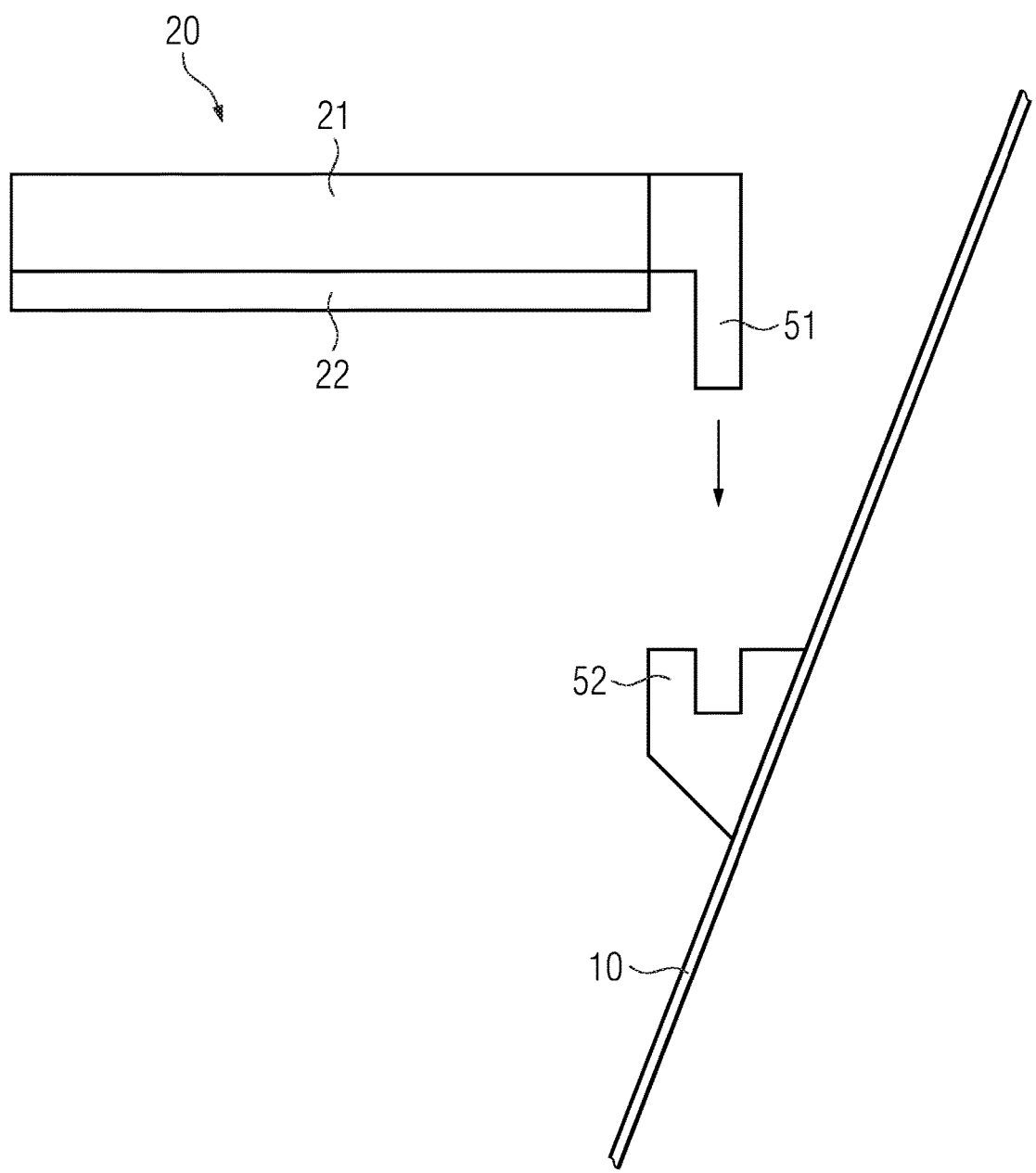
FIG. 25 shows the attachment of the platform assembly by means of a support bracket.

FIG. 25 shows the attachment of the platform assembly 20 by means of a support bracket 50. The support bracket 50 comprises a support bracket pin 51 coupled to the platform assembly 20 and a support bracket socket 52 coupled to the main bearing reinforcement plate 10. The use of a support bracket 50 to support the platform assembly 20 increases the stability of the platform assembly 20 and helps securing the platform assembly 20 to the main bearing when the first platform 21 is in a horizontal position.

Figure 26:
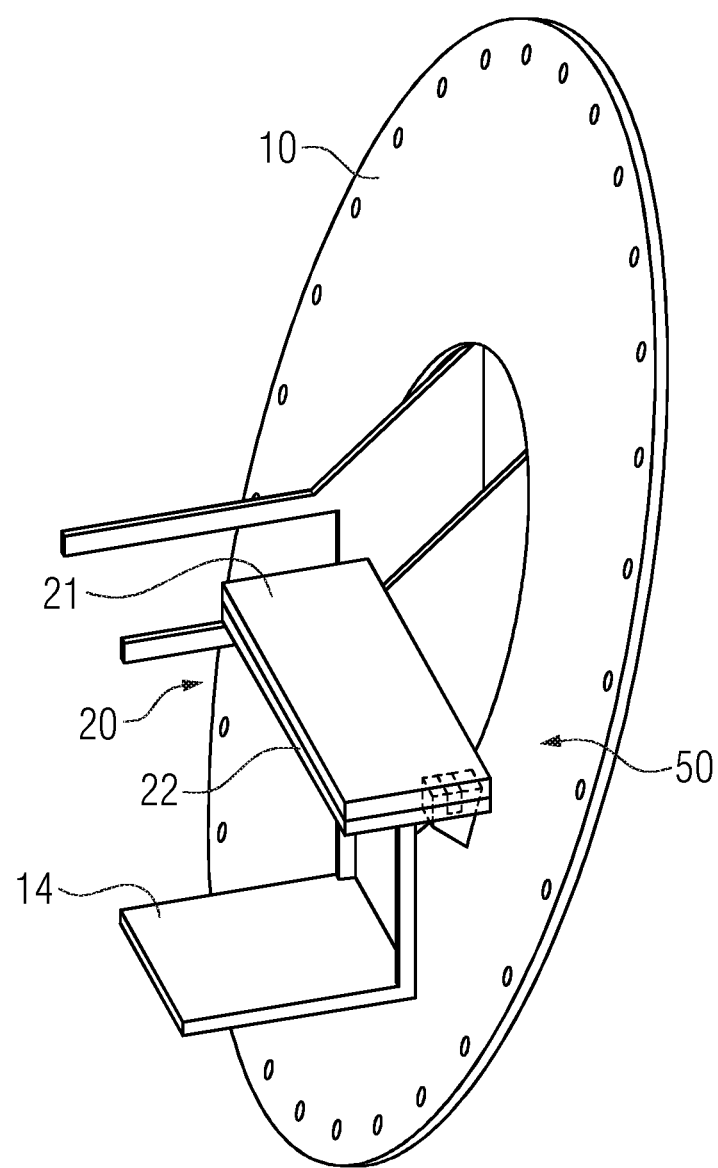
FIG. 26 shows the platform assembly comprising a support bracket and the rotation of a tilted main bearing reinforcement plate.
Figure 27:
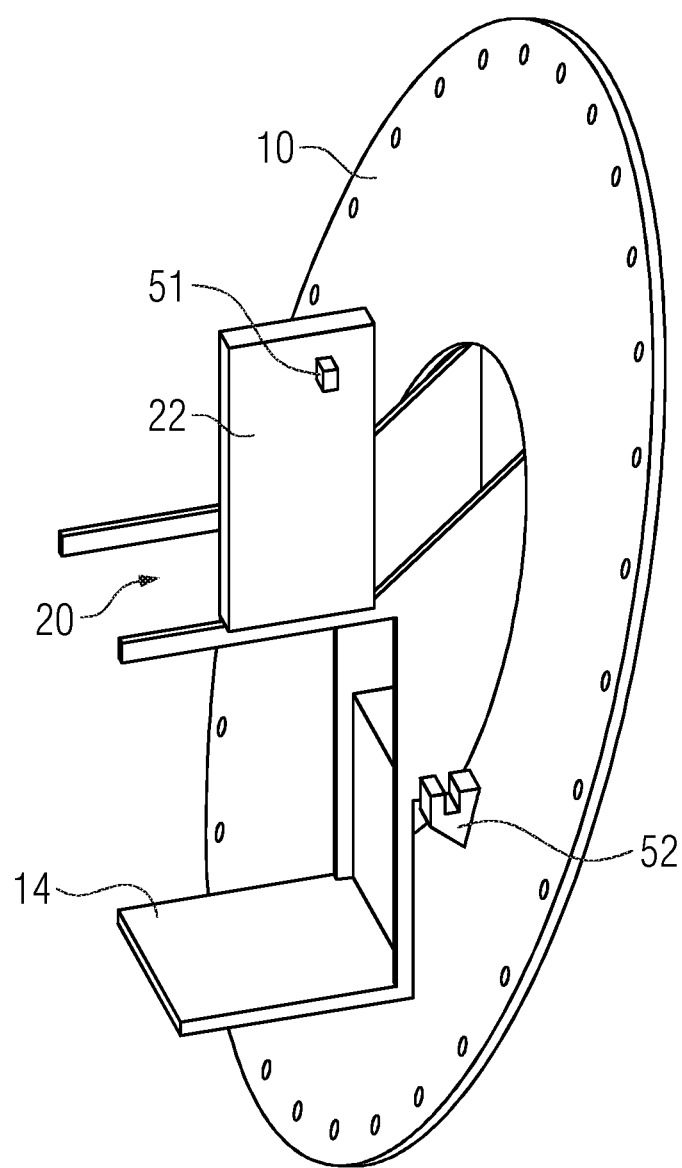
FIG. 27 shows the platform assembly comprising a support bracket and the rotation of a tilted main bearing reinforcement plate.
Figure 28:
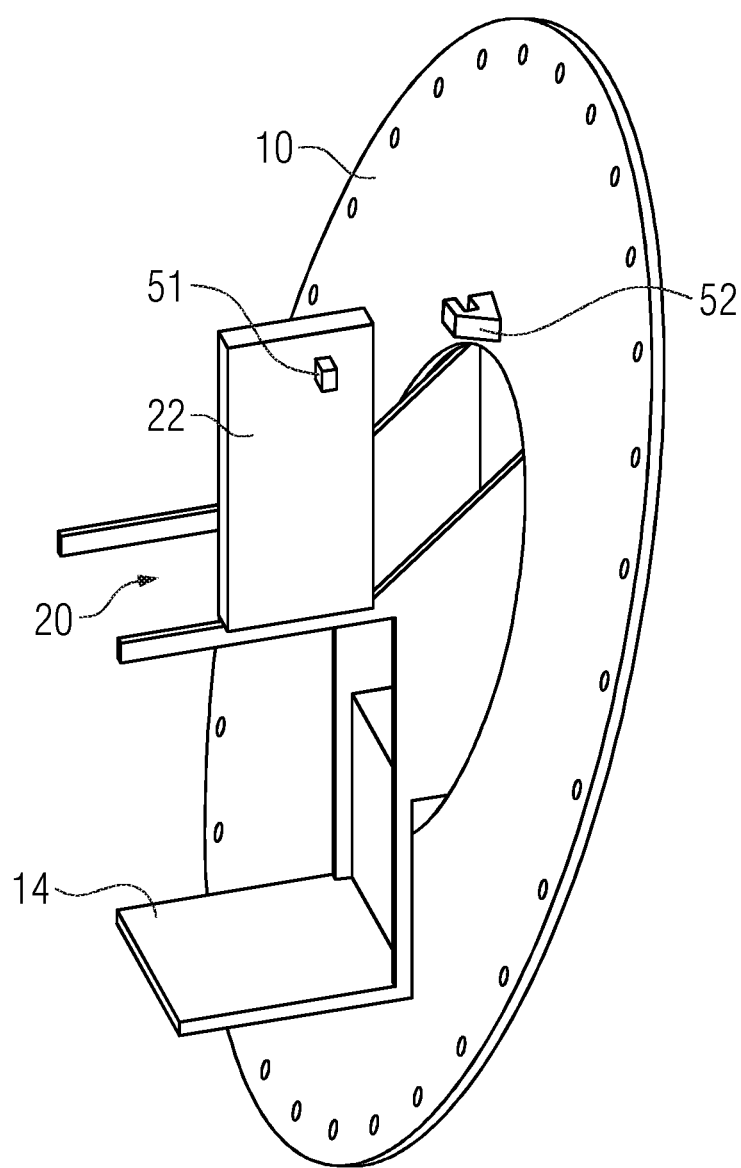
FIG. 28 shows the platform assembly comprising a support bracket and the rotation of a tilted main bearing reinforcement plate.

FIGS. 26 to 28 show a main bearing reinforcement plate 10 in a tilted position, i.e. at a specific angle from the vertical position. This is a usual design for main bearings.

In FIG. 26, the platform assembly 20 is at the horizontal position, wherein the platform assembly 20 is coupled to the main bearing reinforcement plate 10 by means of a support bracket 50. After supporting the platform assembly 20 by means of the support bracket 50, the second platform 22 of the platform assembly 20 can be extended in axial direction 6 to the second state 28. Through the support bracket 50, the platform assembly 20 is secured for workers to work on the working surface of the platform assembly 20 when the platform assembly 20 or at least the first platform 21 of the platform assembly 20 is at the horizontal position.

FIGS. 27 and 28 show a schematic view of the vertical position of the platform assembly 20, wherein the platform assembly 20 is decoupled from the main bearing reinforcement plate 10 and the main bearing reinforcement plate 10 rotates. This is the case when the platform assembly 20 is in the first state 27, in which the second platform 22 is decoupled from the first platform 21 or, as shown in this Figure, stowed below the first platform 21 to limit the surface of the platform assembly 20 inside the hub 4.

As shown in FIG. 28, due to the tilted main bearing reinforcement plate 10, there is a clearance between the support bracket pin 51 and the support bracket socket 52, i.e., a clearance between the platform assembly 20 and the main bearing, when the platform assembly 20 is in a vertical position, which avoids collisions between the support bracket pin 51 and the support bracket socket 52 when the main bearing and the hub 4 rotates. Due to the schematic nature of the Figure, no clearance is shown between the hub access structure 14 and the main bearing reinforcement plate 10. However, during the design of the hub access structure 14, care should be taken so that neither the main bearing reinforcement plate 10 nor the support bracket socket 52 collide with the hub access structure 14, for example by shifting the step of the hub access structure 14 in the axial direction 6.

It is also possible to install a damper 24 between the platform assembly 20 and the hub access structure 14, which is not shown here.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

REFERENCE LIST

1 Wind turbine
2 Tower
3 Nacelle
4 Hub
5 Blade
6 Axial direction
10 Main bearing reinforcement plate
11 Blade bearing reinforcement plate
12 Fastening means
13 Fastening means circle
14 Hub access structure
15 Main bearing reinforcement plate opening
16 Pitch lock
20 Platform assembly
21 First platform
22 Second platform
23 Rail
24 Damper
25 Tilting angle
26 Platform support
27 First state
28 Second state
29 Third state
30 Hinge
31 Lock pin
32 Lock socket
33 Bushing
34 Spring
35 Nut
36 Rotating system
40 Telescopic system
41 Telescopic arm
42 Telescopic surface member
50 Support bracket
51 Support bracket pin
52 Support bracket socket

The invention claimed is:

1. A platform assembly for a hub of a wind turbine configured to provide a working surface inside the hub, wherein the platform assembly comprises a first platform coupled to a hub access structure, wherein the hub access structure extends in an axial direction between a nacelle of the wind turbine and the hub and provides access from the nacelle to the hub, and wherein the hub access structure passes through a main bearing reinforcement plate opening without contacting the main bearing reinforcement plate, wherein the platform assembly comprises a second platform configured to be coupled to the first platform, wherein the second platform is configured to be positioned in such a way that a surface of the second platform extends substantially in the axial direction, and wherein the platform assembly comprises a telescopic system for moving the second platform from a stowed position to an extended position, in which the surface of the second platform extends substantially in the axial direction and/or has a first state, in which the second platform is decoupled from the first platform or stowed on, below, or in front of the first platform to limit the surface of the platform assembly inside the hub.

2. The platform assembly according to claim 1, wherein the first platform extends in a direction substantially perpendicular to the axial direction.

3. The platform assembly according to claim 1, wherein the telescopic system comprises a telescopic arm and a telescopic surface member.

4. The platform assembly according to claim 1, wherein the platform assembly comprises a rotating system for rotating the second platform relative to the first platform.

5. The platform assembly according to claim 4, wherein the rotating system comprises a hinge for the rotational movement and a lock pin and a lock socket for securing the second platform in a stowed position and/or in a rotated position.

6. The platform assembly according to claim 1, wherein the first platform is moveable between a horizontal and a vertical position.

7. The platform assembly according to claim 1, wherein the platform assembly has a second state, in which the second platform is coupled to the first platform, wherein the second platform extends in the axial direction to increase the working surface inside the hub.

8. The platform assembly according to claim 7, wherein the second platform comprises a platform support configured to support the platform in the second state.

9. The platform assembly according to claim 1, wherein the platform assembly has a third state, in which the platform assembly is moved at a tilting angle between a horizontal and a vertical position in order to rotate the hub without colliding the hub with the platform assembly.

10. The platform assembly according to claim 1, wherein the platform assembly further comprises rails.

11. The platform assembly according to claim 1, wherein the platform assembly further comprises a damper configured to absorb shock impulses.

12. A method for increasing a working surface inside a hubs comprising:

providing a platform assembly having a first platform coupled to a hub access structure and a second platform coupled to the first platform, wherein the hub access structure extends in an axial direction between a nacelle of the wind turbine and the hub and provides access from the nacelle to the hub, wherein the hub access structure passes through a main bearing reinforcement plate opening without contacting the main bearing reinforcement plate, wherein the second platform is configured to be positioned in such a way that a surface of the second platform extends substantially in the axial direction, wherein the platform assembly has a first state, in which the second platform is stowed on, below or in front of the first platform and a second state, wherein the second platform extends from the first platform in the axial direction to increase the working surface inside the hub, and wherein the platform assembly comprises a rotating system, and rotating the second platform relative to the first platform to switch from the first state to the second state.

13. A platform assembly for a hub of a wind turbine configured to provide a working surface inside the hub, wherein the platform assembly comprises a first platform coupled to a hub access structure, wherein the hub access structure extends in an axial direction between a nacelle of the wind turbine and the hub and provides access from the nacelle to the hub, wherein the platform assembly comprises a second platform configured to be coupled to the first platform, wherein the second platform is configured to be positioned in such a way that a surface of the second platform extends substantially in the axial direction, and wherein the platform assembly has a tilted state, in which the platform assembly is moved at a tilting angle between a horizontal and a vertical position in order to rotate the hub without colliding the hub with the platform assembly.

14. The platform assembly according to claim 13, wherein the platform assembly has a first state, in which the second platform is decoupled from the first platform or stowed on, below or in front of the first platform to limit the surface of the platform assembly inside the hub, particularly when the hub is rotating.

15. The platform assembly according to claim 14, wherein the first platform is moveable between a horizontal and a vertical position, particularly when the platform assembly is in the first state.

16. The platform assembly according to claim 13, wherein the platform assembly has a second state, in which the second platform is coupled to the first platform, wherein the second platform extends in the axial direction to increase the working surface inside the hub.

17. The platform assembly according to claim 16, wherein the second platform comprises a platform support configured to support the platform in the second state.

* * * * *